(12) United States Patent
Fukuda

(10) Patent No.: US 6,170,597 B1
(45) Date of Patent: Jan. 9, 2001

(54) TRANSMISSION FOR OFFROAD VEHICLE

(75) Inventor: Kazutaka Fukuda, Iwata (JP)

(73) Assignee: Yamaha Hatsudoki Kabushiki Kaisha, Shizuoka-ken (JP)

( * ) Notice: Under 35 U.S.C. 154(b), the term of this patent shall be extended for 0 days.

(21) Appl. No.: 09/069,009

(22) Filed: Apr. 28, 1998

(30) Foreign Application Priority Data

Apr. 30, 1997 (JP) .................................................. 9-128086
Apr. 30, 1997 (JP) .................................................. 9-128087
May 29, 1997 (JP) .................................................. 9-157386

(51) Int. Cl.[7] ............................. B60K 1/00; B60K 17/16; B60K 17/22; F16H 37/06
(52) U.S. Cl. ......................... 180/292; 180/375; 180/376; 74/665 GA; 474/84
(58) Field of Search ............................. 74/665 F, 665 G, 74/665 GA, 665 GE; 180/291, 292, 297, 374, 375, 376, 230; 474/13, 15, 17, 84, 86, 87

(56) References Cited

U.S. PATENT DOCUMENTS

| | | | |
|---|---|---|---|
| 4,412,515 | * | 11/1983 | Fritzenwenger .................. 123/198 E |
| 4,574,652 | * | 3/1986 | Shichinohe et al. .................... 74/474 |
| 4,666,015 | * | 5/1987 | Matsuda et al. ..................... 180/233 |
| 4,722,235 | * | 2/1988 | Kumazawa .......................... 74/15.66 |
| 4,736,809 | * | 4/1988 | Kumazawa .......................... 180/75.1 |
| 5,152,361 | * | 10/1992 | Hasegawa et al. .................... 180/230 |
| 5,515,940 | * | 5/1996 | Shichinohe et al. .................. 180/376 |
| 5,699,872 | * | 12/1997 | Miyakawa et al. ................... 180/291 |

* cited by examiner

*Primary Examiner*—Lanna Mai
*Assistant Examiner*—Jeff Restifo
(74) *Attorney, Agent, or Firm*—Knobbe, Martens, Olson & Bear LLP

(57) ABSTRACT

A transmission arrangement for an offroad vehicle is disclosed. The offroad vehicle has a frame, at least two wheels supporting the frame, and an internal combustion engine supported by the frame. The engine has at least one cylinder, a piston positioned in the cylinder and reciprocating along a first axis, the piston driving a crankshaft of the engine. The crankshaft is arranged to drive at least one of the wheels through the transmission, the vehicle having a front end and a rear end and a longitudinal centerline extending through the ends, the crankshaft extending along a first axis parallel to the centerline. The transmission includes a chamber defined by a case, a primary shaft at least partially positioned in the chamber and driven by the crankshaft, a main shaft at least partially positioned in the chamber and offset from said primary shaft, the main shaft driven by the primary shaft by a belt positioned in the chamber. The main shaft is arranged to drive at least one of the wheels. At least a portion of the case faces the front end of the vehicle unobstructed.

56 Claims, 18 Drawing Sheets

US 6,170,597 B1

TRANSMISSION FOR OFFROAD VEHICLE

FIELD OF THE INVENTION

The present invention relates to an offroad vehicle. More particularly, the invention is a transmission arrangement for an offroad vehicle.

BACKGROUND OF THE INVENTION

Offroad vehicles or "ATVs" as they are commonly referred to are designed to be operated over rugged terrain. These vehicles are often operated on steep inclines and declines, on rough roads, and in mud and water.

These vehicles include a frame supported by wheels. In one common arrangement, the vehicle has four wheels. An internal combustion engine is used to power at least one, and most commonly all, of the wheels.

In this arrangement, a first drive shaft extends to a front axle and a second drive shaft extends to a rear axle. Each of these drive shafts extends generally parallel to a centerline of the vehicle extending in the front and rear directions.

The first and second drive shafts are driven by a crankshaft of the engine. The vehicle includes a transmission through which the first and second drive shafts are powered by the crankshaft.

It is very desirable for the engine and related drive train of the vehicle to have a compact arrangement. To facilitate this goal, the rotation of the crankshaft must be transmitted to the first and second drive shafts with a compact transmission. In addition, the transmission must be arranged to prevent heat damage to the transmission components. The close placement of the transmission components lessens heat dissipation and makes more likely heat damage the components of the transmission.

It is an object of the present invention to provide an offroad vehicle with a transmission which is both compact and which is arranged to avoid excessive heating of the components thereof.

SUMMARY OF THE INVENTION

The present invention is a transmission arrangement for an offroad vehicle. The offroad vehicle has a frame which is supported by at least two wheels.

An internal combustion engine is supported by the frame. The engine has at least one cylinder, a piston positioned in the cylinder and reciprocating along a first axis, the piston driving a crankshaft of the engine. The crankshaft is arranged to drive at least one of the wheels through the transmission, the vehicle having a front end and a rear end and a longitudinal centerline extending through the ends, the crankshaft extending along a first axis parallel to the centerline.

The transmission includes a belt chamber defined by a belt case, a primary shaft at least partially positioned in the belt chamber and driven by the crankshaft, a main shaft at least partially positioned in the belt chamber and offset from said primary shaft, the main shaft driven by the primary shaft by a belt positioned in the belt chamber. The main shaft is arranged to drive at least one of the wheels. At least a portion of the belt case faces the front end of the vehicle unobstructed.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

Figure 1:
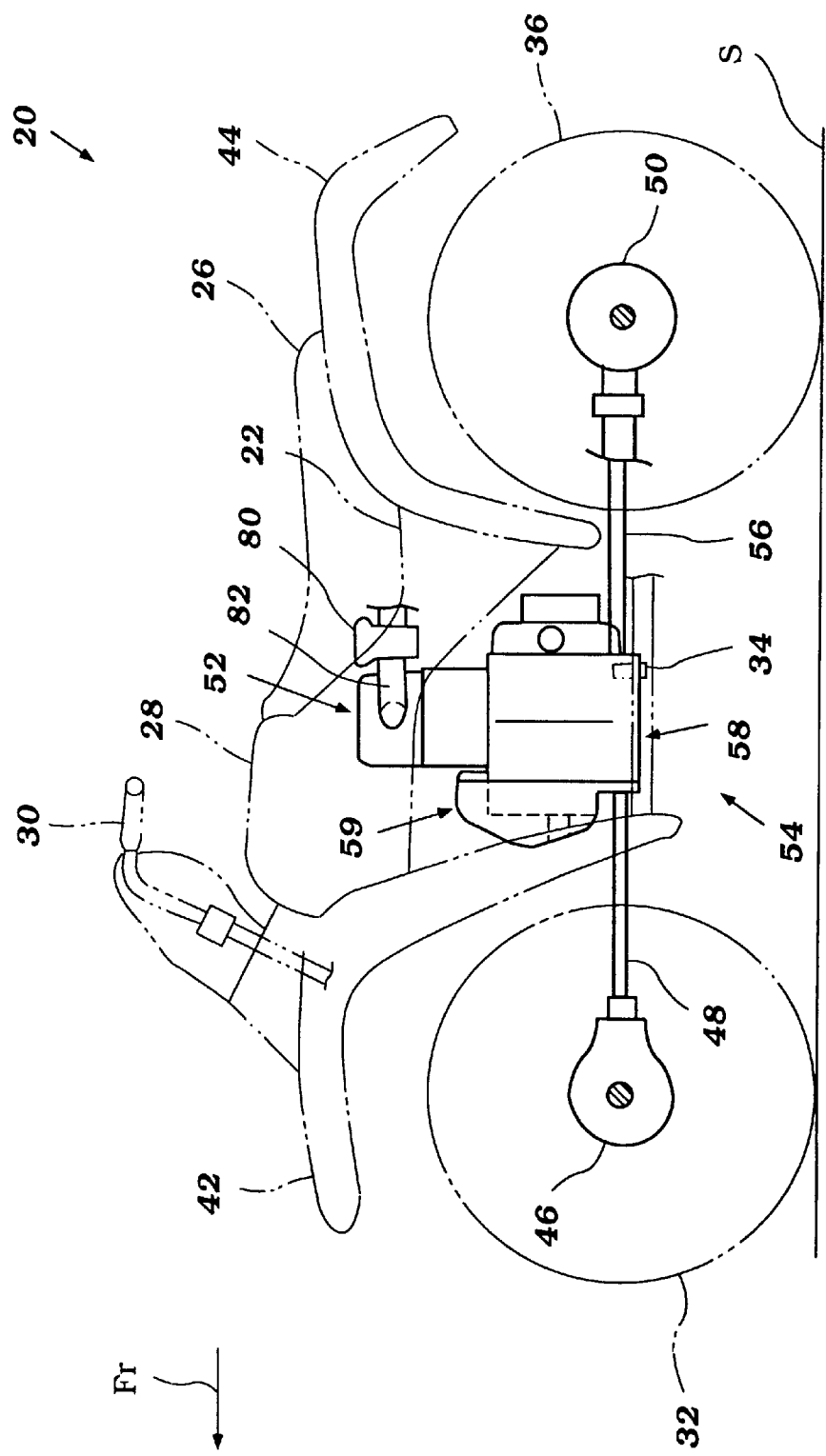
FIG. 1 is a side view of an offroad vehicle powered by an engine and having a transmission arranged in accordance with the present invention.

The present invention is a transmission arrangement for a offroad vehicle 20. Referring to FIG. 1, the offroad vehicle 20 comprises an all-terrain vehicle or "ATV." While the transmission of the present invention is described with this particular type of vehicle, those of skill in the art will appreciate that the invention may have utility in a wide range of applications.

Figure 2:
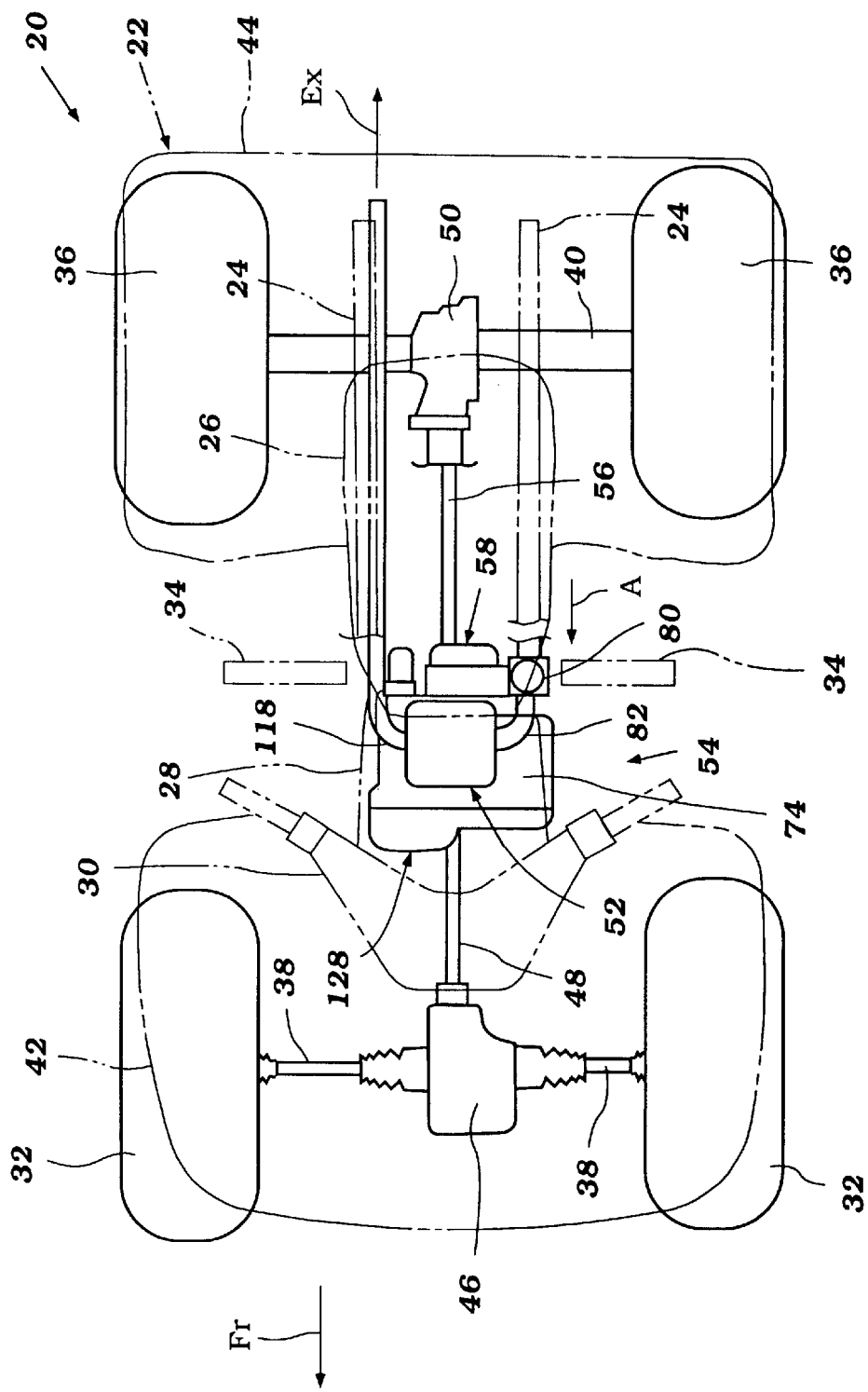
FIG. 2 is a top view of the offroad vehicle illustrated in FIG. 1, with portions thereof illustrated in phantom to expose the frame and drive layout of the vehicle.

The vehicle 20 has a tubular, open type frame 22 or body. The frame 22 may be arranged in a variety of configurations as well known to those of skill in the art. As illustrated in FIG. 2, the frame 22 includes a pair of spaced, generally horizontally extending seat rails 24.

As illustrated in FIGS. 1 and 2, a seat 26 is supported at least partially by the seat rails 24. The seat 26 is positioned to the rear of a fuel tank 28 which is also supported by the upper tubes 24, but close to a steering handle 30 positioned to the front of the fuel tank 28. The steering handle 30 is arranged to control an appropriate steering mechanism for steering a pair of front wheels 32.

A pair of foot pegs 34 extend from the frame 22 on either side of the seat 26. The foot pegs 34 are positioned lower than the seat 26 to provide a convenient step for the user of the vehicle 20 to mount it and during use provide a foot rest.

Referring to FIGS. 1 and 2, the frame 22 is rollably supported on a surface S by the pair of front wheels 32 and a pair of rear wheels 36. Each front wheel 32 is mounted to a front axle 38, while the rear wheels 36 are mounted to a rear axle 40. As illustrated, the vehicle 20 has a front end facing in a direction Fr.

A front fender 42 extends from generally behind each front wheel 32 over the top thereof towards the front end of the vehicle 20. Likewise, a rear fender 44 extends from generally in front of each rear wheel 36 over the top thereof towards the rear of the vehicle 20. The front and rear fenders 42, 44 are preferably constructed of a light-weight, corrosion resistant material such as a resin or plastic, and are mounted to the frame 22.

Figure 3:
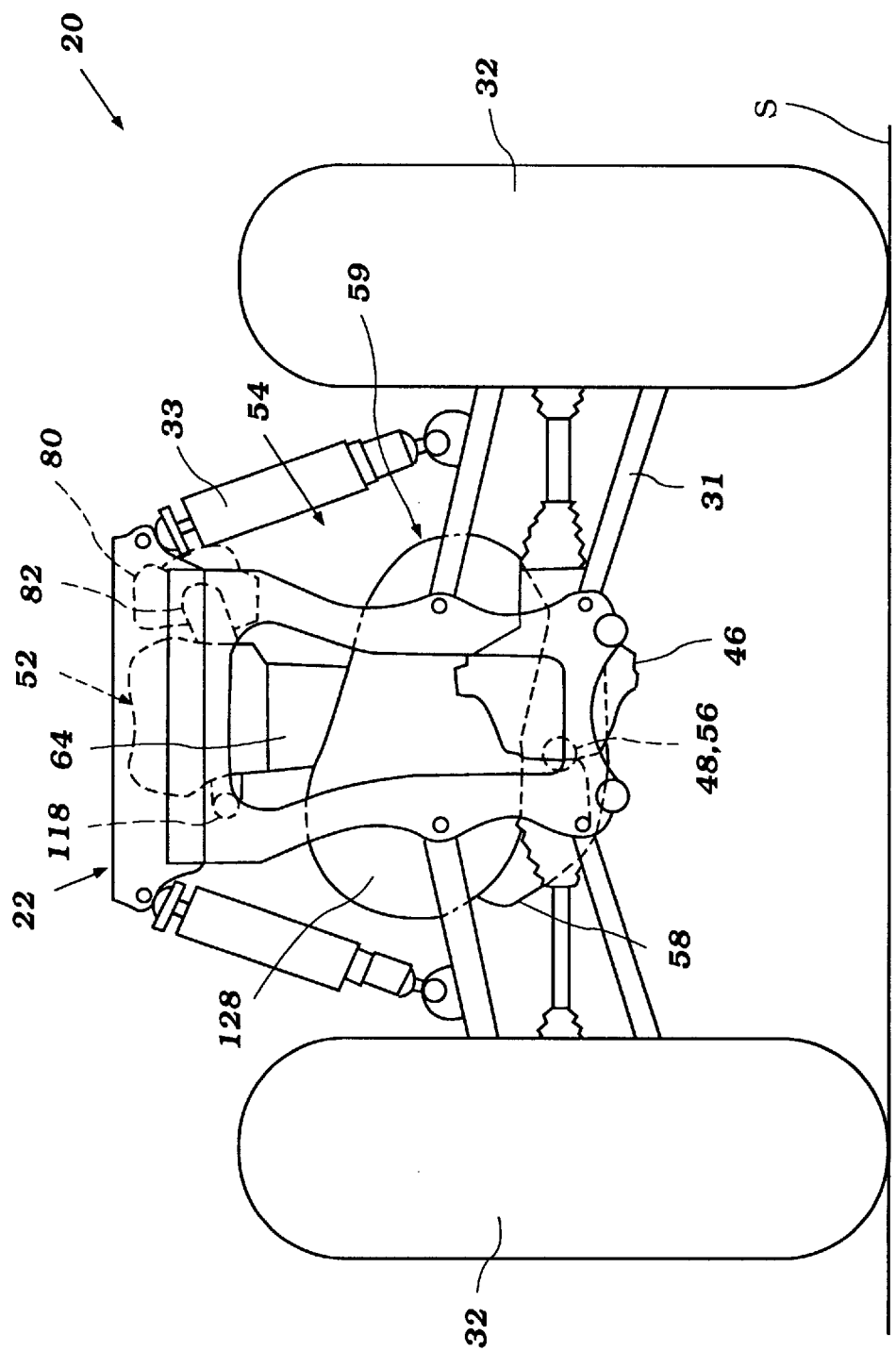
FIG. 3 is a front end view of the offroad vehicle illustrated in FIG. 1 with portions thereof removed to expose a frame and drive layout of the vehicle.

As illustrated in FIG. 3, each front wheel 32 is preferably mounted to the frame 22 via pivoting arm assemblies 31. This mounting arrangement permits the front wheels 32 to move up and down independently of one another with respect to the frame 22. A shock absorbing member 33 is preferably provided for damping the movement of each wheel 32.

Means are provided for driving each of the front and rear wheels 32, 36. As illustrated, each front axle 38 extends between its respective front wheel 32 and a front differential 46, permitting individual movement of the front wheels 32 with respect to one another. The front differential 46 is arranged to transmit power from a front drive shaft 48 (described in greater detail below) to each of these axles 38, which extend transverse to the drive shaft 48. This type of differential is well known to those of skill in the art.

In the embodiment illustrated, there is but a single rear axle 40 to which both of the rear wheels 36 are mounted. The rear wheels 36 are also mounted for vertical movement with respect to the frame 22. In that regard, the rear axle 40 is movably mounted to the frame 22, preferably by attachment to a pivoting trailing arm (not shown).

A rear differential or gear box 50 is supported by the axle 40 and trailing arm. A shock absorbing member may be provided between the frame 22 and the trailing arm or axle 40 for damping the movement thereof. The rear axle 40 is driven by a rear drive shaft 56 which is mounted for pivoting movement.

As illustrated generally in FIGS. 1 and 2, a drive unit 54 is arranged to drive the front and rear drive shafts 48, 56. The drive unit 54 includes an engine 52 mounted to and supported by the frame 22 of the vehicle 20, and a transmission 58 through which the engine 52 drives the wheels 32, 36. While the drive unit 54 is arranged to drive all four wheels 32, 36 it is contemplated that as few as one wheel may be powered.

The engine 52 will be described with reference primarily to FIGS. 4–7. As illustrated, the engine 52 is of the internal combustion type, having a single cylinder and operating on a four-cycle principle. Those of skill in the art will appreciate that the engine 52 may have more than one cylinder and operate in accordance with other cycles, such as a two-cycle principle.

The engine 52 has a cylinder body 60 having a cylinder head 62 connected to a top end thereof. The cylinder block 60 and head 62 cooperate to define a single cylinder 64 having an axis C1.

A piston 66 is movably mounted in the cylinder 64. A top end of the piston 66 cooperates with the cylinder 64 to define a combustion chamber 68 portion thereof. The piston 66 is connected via a connecting rod 70 to a crankshaft 72. As illustrated in FIG. 2, an axis C2 passes through the center of the crankshaft 72. The crankshaft 72 is arranged so that this axis C2 extends generally parallel to a longitudinal axis or centerline through the vehicle 20 extending through its front and rear ends.

The crankshaft 72 is mounted for rotation within a crankcase 74. The crankcase 74 is defined by a crankcase cover 76 connected to an opposite end of the cylinder body 60 from the cylinder head 62.

Air A is supplied to the combustion chamber 68 through a suitable intake system 78. Air is drawn through an intake and routed through a carburetor 80 to an intake pipe 82. The pipe 82 defines a passage leading to an intake passage 84 in the cylinder head 62 which leads to the combustion chamber 68. Preferably, the air intake is positioned under the seat 26 to reduce the occurrence of water and other material from being drawn into the intake system. An air filter element may be positioned along the intake path.

Preferably, fuel is added to the air passing through the intake system. As illustrated, fuel is supplied to the air passing through the carburetor 80, whereby a combined air and fuel mixture A/F is delivered to the engine 52. The manner by which carburetors operate and their construction is well known in the art. Those of skill in the art will also appreciate that the fuel may be injected with a fuel injector, either directly or indirectly.

Means are provided for controlling the flow of the air and fuel mixture A/F into the combustion chamber 68. This means preferably comprises an intake valve 86. As illustrated, the valve 86 has a head which selectively closes an intake port of the passage 84.

Means are also provided for moving the intake valve 86 between a first position in which it closes the port and a second position in which the air and fuel mixture A/F is permitted to flow into the combustion chamber 68. This means comprises valve drive mechanism 87 including a camshaft 88.

The camshaft 88 is rotatably mounted to the cylinder head 62 within a cam chamber 90 defined by a valve cover 92 connected to the cylinder head 62. The camshaft 88 has camming surfaces which are arranged to operate a rocker arm 94 corresponding to the intake valve 86. A first end of the rocker arm 94 rides on the camming surface, while a second end thereof engages a stem portion of the intake valve 86. The rocker arm 94 is pivotally mounted between its ends on a support shaft 96.

A spring 98 or other biasing means is provided along the stem of the intake valve 86 for biasing the valve into a closed position. When the camshaft 88 raises the first end of the rocker arm 94 upwardly, the second end of the rocker arm pushes the valve 96 downwardly into an open position.

Means are provided for rotating the camshaft 88. This means comprises a camshaft drive 100. The drive 100 includes a drive gear 102 mounted on the crankshaft 72, a driven gear 104 mounted on the camshaft 88, and a flexible transmitter 106. The flexible transmitter 106 preferably comprises a chain and is driven by the drive gear 102 and drives the driven gear 104. Those of skill in the art will appreciate that the camshaft drive 100 may comprise meshing gears, a belt drive or other means known in the art.

A suitable ignition system is provided for igniting the air and fuel mixture which is supplied to the combustion chamber 68. This ignition system includes a coil 108 mounted at the end of the crankshaft 72 which provides electric power to an ignition coil, which is selectively discharged to a spark plug 110 having its electrode positioned in the combustion chamber 68.

The products of combustion are selectively routed from the combustion chamber 68 through an exhaust system 114. The exhaust system 114 includes an exhaust passage 116 leading through the cylinder head 62 from the combustion chamber 68 at an exhaust port. An exhaust pipe 118 defines a passage extending from the exhaust passage 116 where it exits the head 62. The exhaust pipe 118 routes exhaust Ex to the rear of the vehicle 20. A muffler may be provided along the exhaust pipe 118.

Means are provided for controlling the flow of exhaust Ex from the combustion chamber 68 to the passage 116. This means includes an exhaust valve 120. The exhaust valve 120 is controlled by the same camshaft 88 which moves the intake valve 86. A rocker arm 122 has a first end riding upon the camshaft 88 and a second end contacting the stem of the exhaust valve 120. The rocker arm 122 is pivotally mounted about a support shaft 124. A spring 98 is again provided for biasing the valve 120 into a closed position.

The movement of the piston 66 turns the crankshaft 72. The motion of the crankshaft 72 is used to drive the drive shafts 48, 56, and thus the wheels 32, 36. Referring to FIGS. 4 and 8–10, the crankshaft 72 drives these shafts 48, 56 through the transmission 58. The transmission 58 includes a gear or belt box 59. The belt box 59 includes a belt case 128 comprising a body 127 connected to the crankcase cover 76 and a cover 126 connected to the body 127. The belt case 128 defines a gear or belt chamber housing several of the components of the transmission, including a belt drive disclosed in detail below.

The crankshaft 72 is supported for rotation within the crankcase 74 by bearings supported by the crankcase cover 76. A flywheel case 130 portion of the crankcase cover 76 defines a flywheel chamber 132. An end of the crankshaft 72 protrudes into this chamber 132. A flywheel 134 is mounted on the crankshaft 72. The flywheel 134 has magnets mounted on it which are used in the coil arrangement 108 for providing ignition firing timing or the like.

Figure 10:
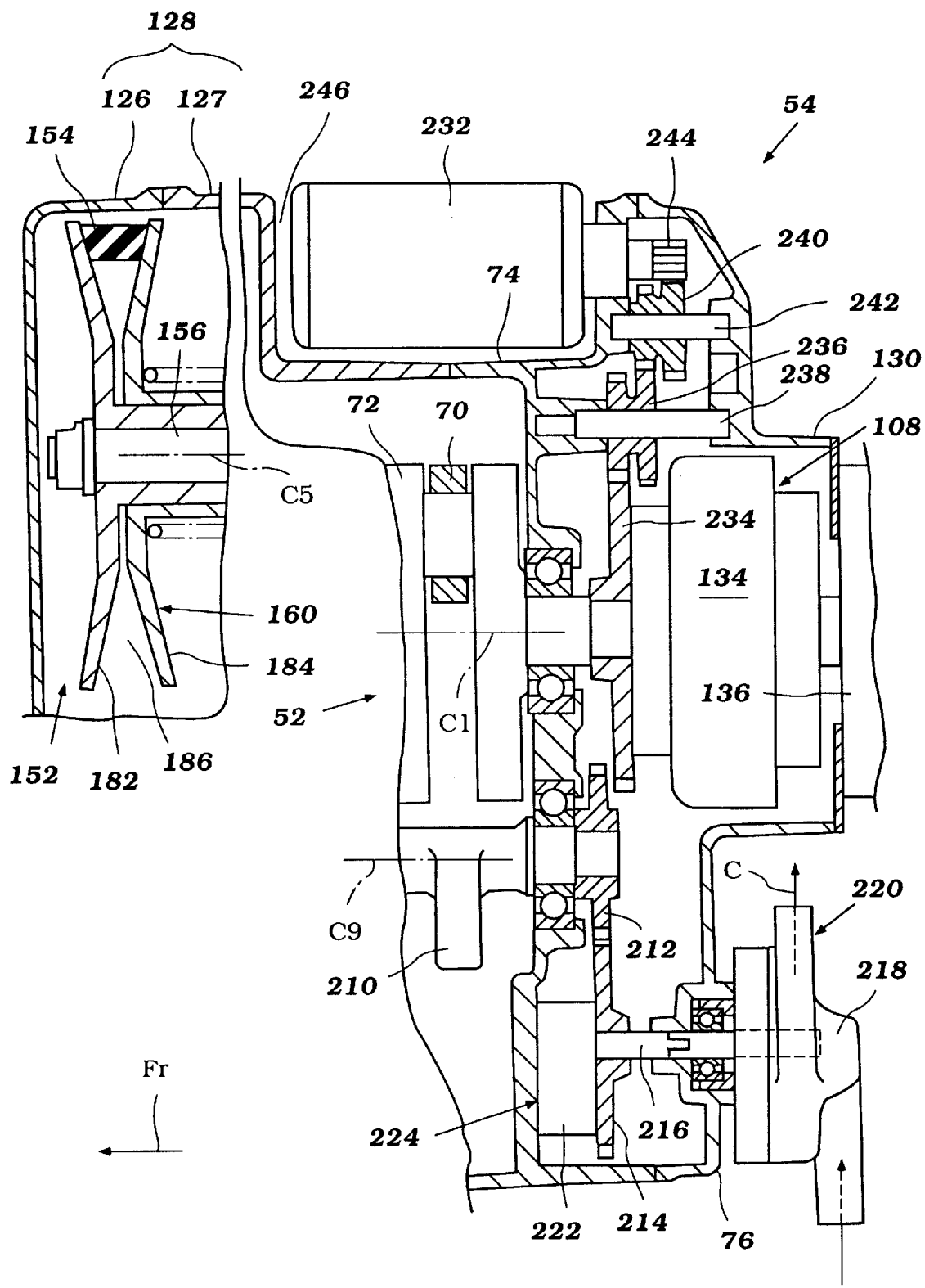
FIG. 10 is a cross-sectional view of an accessory drive portion of the drive unit.
Figure 11:
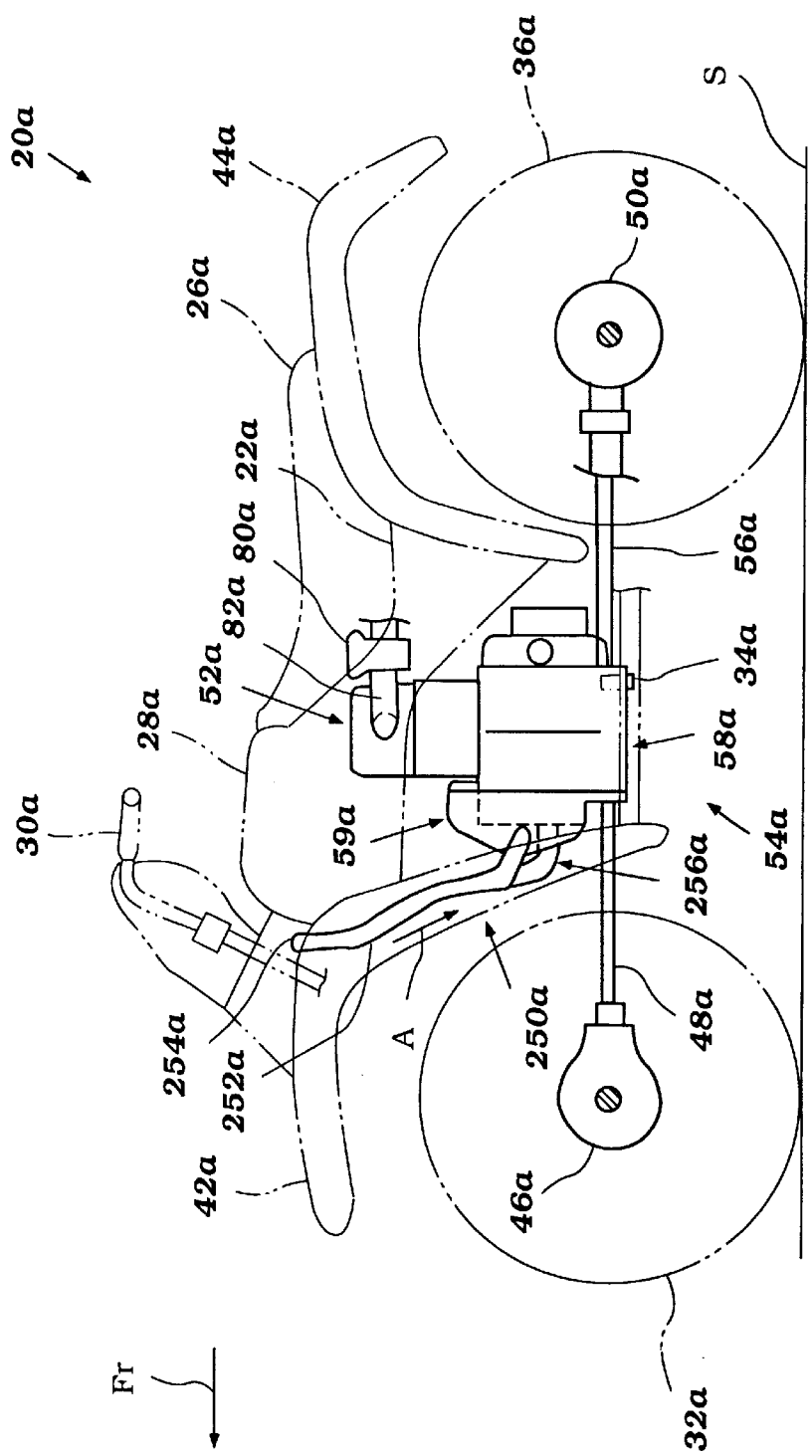
FIG. 11 is a side view of an offroad vehicle having a transmission arrangement in accordance with a second embodiment of the present invention.
Figure 12:
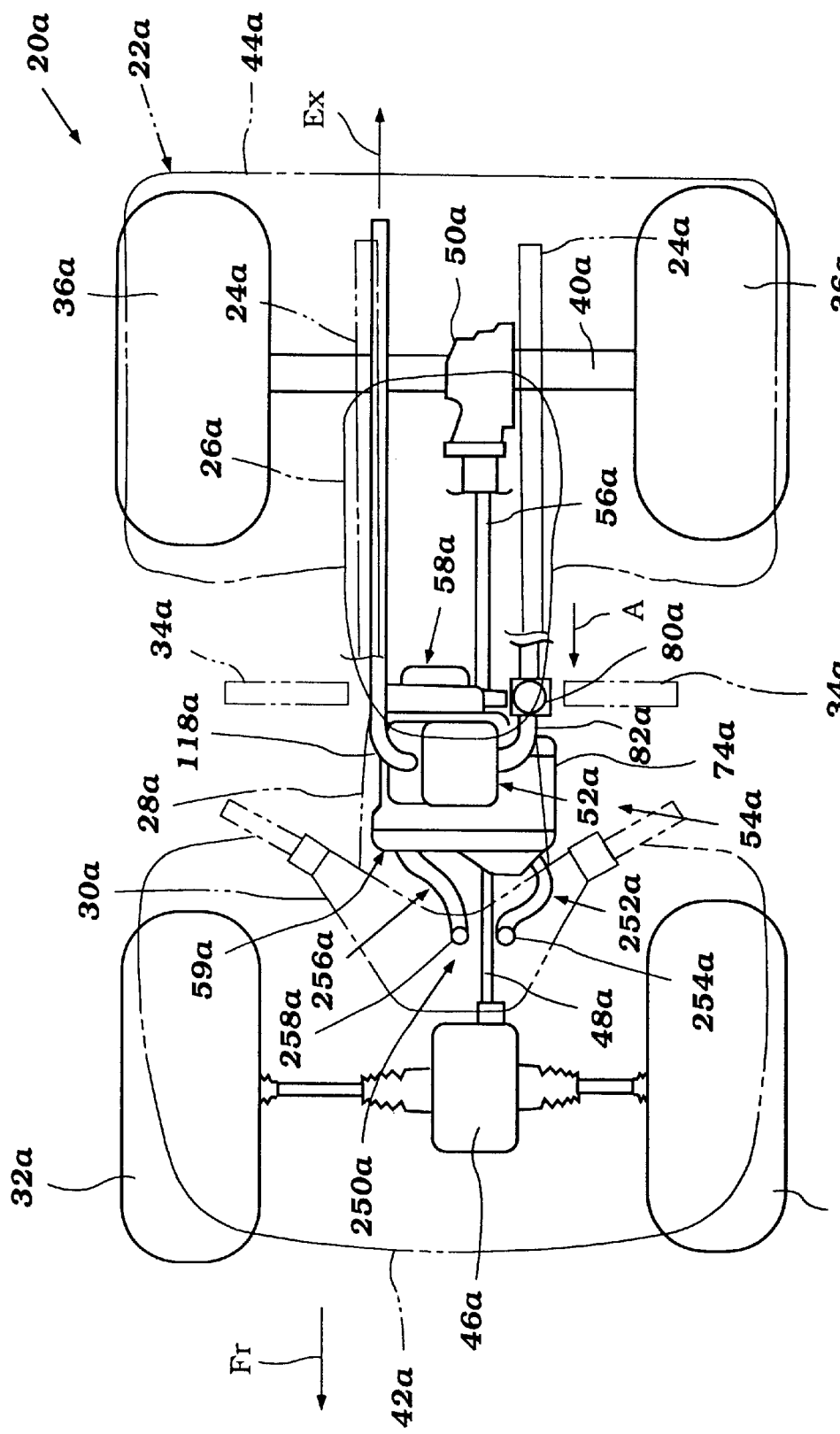
FIG. 12 is a top view of the vehicle illustrated in FIG. 11.
Figure 13:
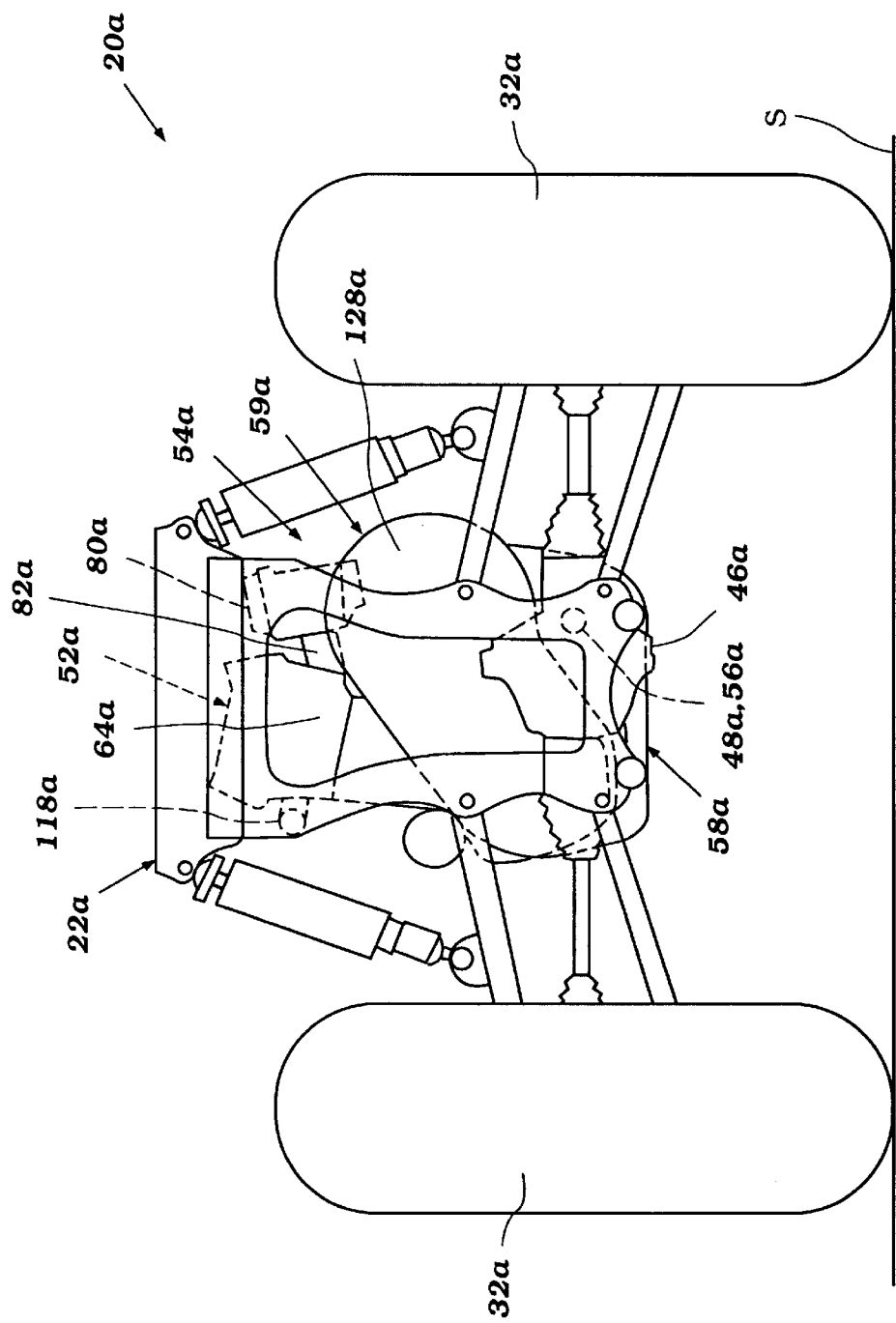
FIG. 13 is a front view of the vehicle illustrated in FIG. 11.

An electric starter 136 is provided at the end of the crankshaft 72 which extends to the flywheel chamber 132, as illustrated in FIG. 10. Preferably, this starter 136 is powered by an electric source and activated by a start button mounted near the steering handle 30 of the vehicle 20.

Figure 8:
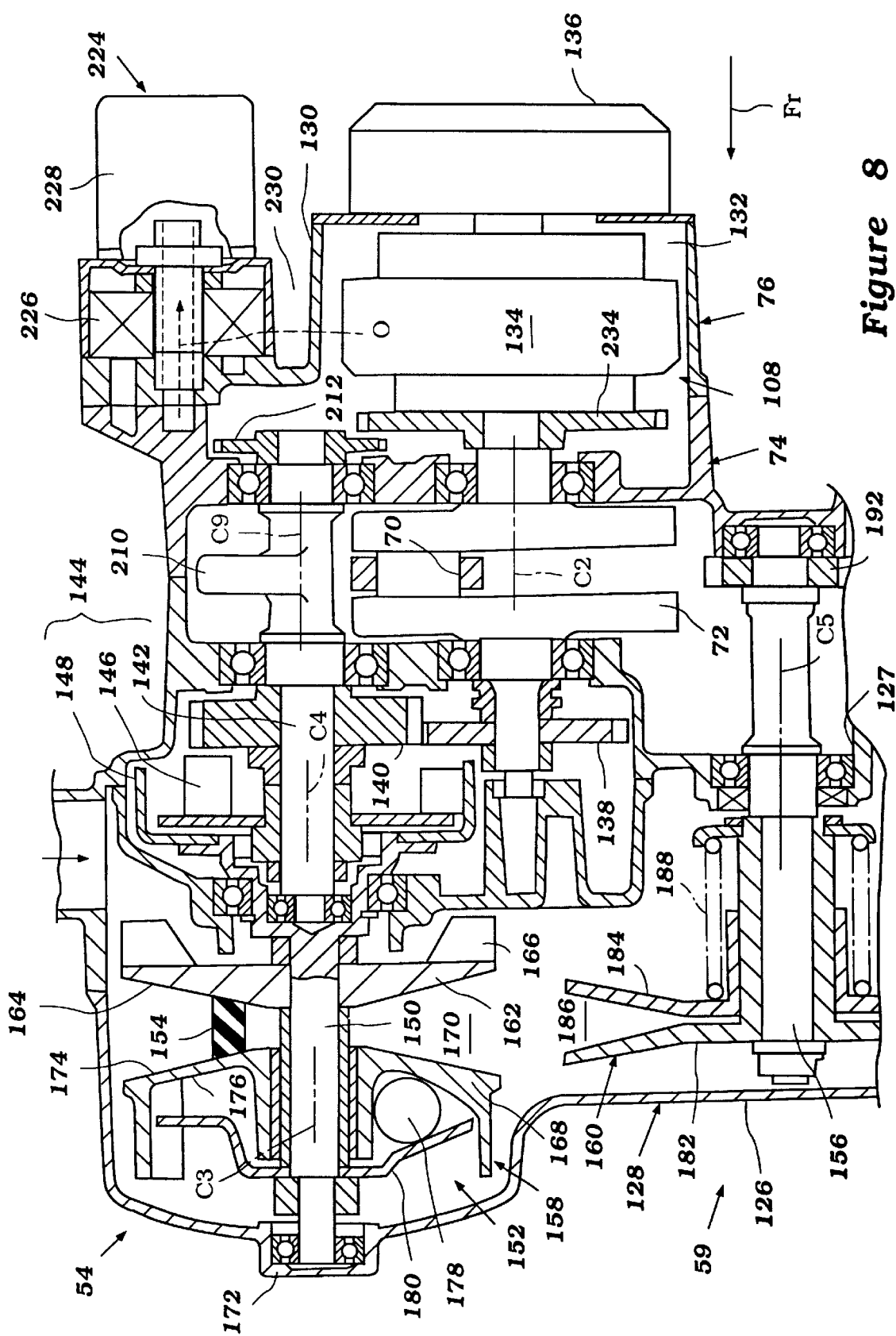
FIG. 8 is a partial cross-sectional view of the transmission of the drive unit of the vehicle.

As illustrated in FIG. 8, the transmission 58 is driven off of an end of the crankshaft 72 generally opposite the starter 136. A drive gear 138 is positioned on the crankshaft 72. This gear 138 drives a driven gear 140 positioned on a clutch shaft 142.

The clutch shaft 142 is part of a clutch 144. As illustrated, the clutch 144 is a centrifugal clutch having a driving member 146 and a clutch plate 148 which is selectively driven by the driving member.

The driving member 146 comprises a pair of shoes which are movably mounted on a support which is connected to the clutch shaft 142. The shoes are arranged to move outwardly and drivingly engage the clutch plate 148 when the speed of the engine 52, and thus the crankshaft 72, exceeds a certain low speed.

Figure 4:
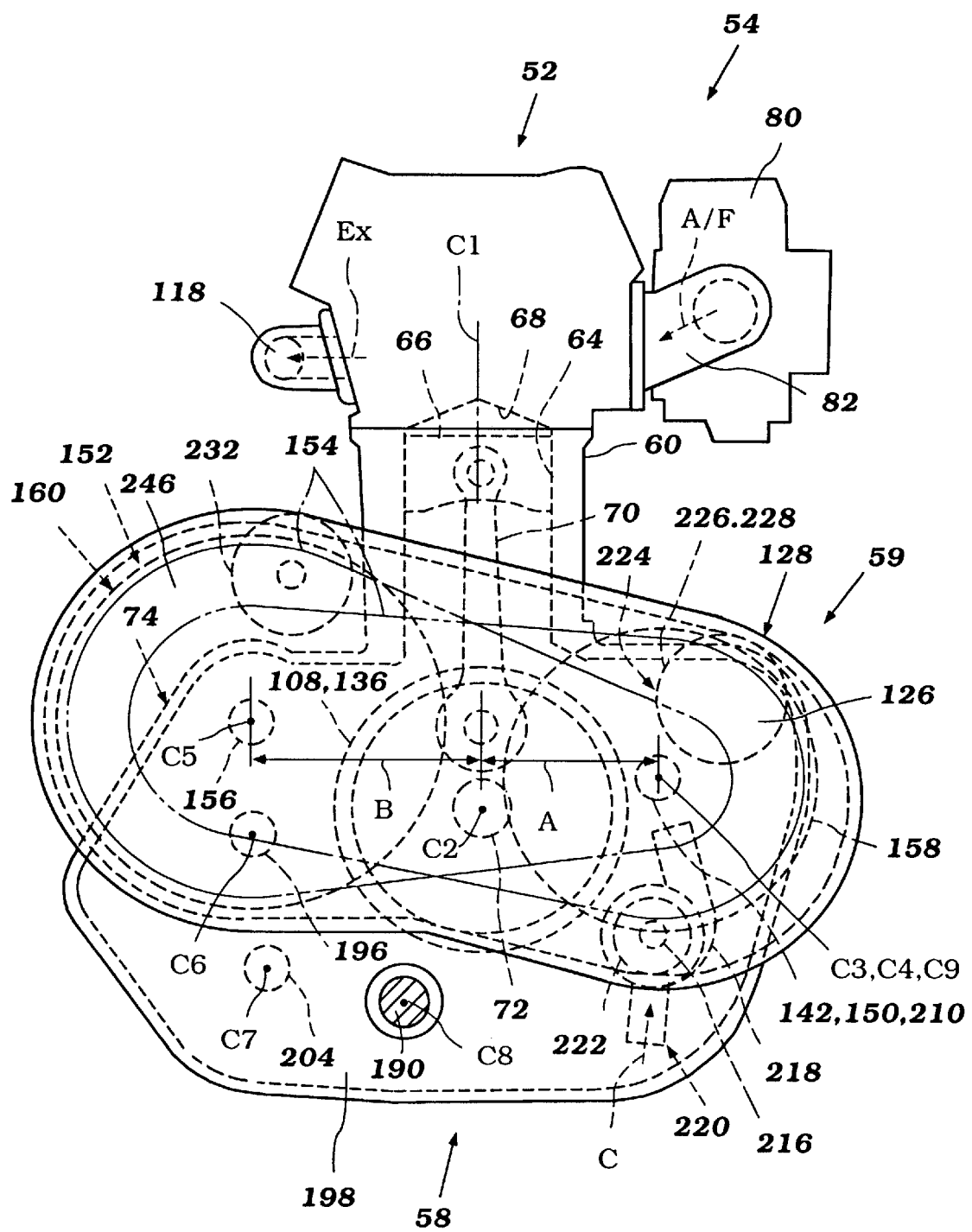
FIG. 4 is a first end view of an engine and transmission of a drive unit of the vehicle illustrated in FIG. 1.

The clutch plate 148 is connected to and supported by a primary shaft 150. This primary shaft 150 has an axis C3 about which it rotates which is aligned with an axis C4 about which the clutch shaft 142 rotates. The axes C3 and C4 are offset from the axis C2 of the crankshaft 72, but extend parallel thereto. Referring to FIG. 4, the axes C3 and C4 are positioned generally horizontally to one side of the crankshaft 72 axis C2, with these axes C3, C4 and C2 spaced by a distance A. The axes C3 and C4 thus also extend parallel to a longitudinal centerline through the vehicle 20 from its front end to its rear end.

The primary shaft 150 is supported at its end opposite the clutch 144 by a support bearing 172. The primary shaft 150 is arranged to drive a belt drive 152. This drive 152 includes a "V"-belt 154 or similar drive means which is used to drive a main shaft 156, described in more detail below. The drive 152 also includes a drive pulley 158 mounted on the primary shaft 150 and a driven pulley 160 on the main shaft 156. This belt drive 152 is positioned in the belt chamber defined by the case 127.

The drive pulley 158 includes a first drive sheave 162 is mounted upon the primary shaft 150. This sheave 162 is fixed in position on the shaft 150 by one or more splines or other attachment. The first sheave 162 has a conical belt drive surface 164.

One or more fins 166 preferably extend outwardly from the side of the first sheave 162 opposite the conical surface 164. These fins 166 move air through the belt chamber for cooling the "V"-belt 154.

A second sheave 168 is movably mounted on a collar extending over the primary shaft 150. This sheave 168 is spaced some distance from the first sheave 162 and cooperates therewith to define a groove 170 therebetween. The second sheave 168 has a conical surface 174 which faces the conical surface 164 of the first sheave 162. The "V"-belt 154 is positioned in the groove 170 and engaged on either side by these conical surfaces 164, 174.

The side of the second sheave 168 opposite the conical surface 174 defines a cam surface 176. A centrifugal weight 178 engages this surface 176. The weight 178 is positioned in an area defined by the surface 176 and a cam plate 180. The cam plate 180 is mounted between the second sheave 168 and the end of the primary shaft 150 and maintained in position thereon, such as with a nut threaded onto the shaft 150.

The cam plate 180 has a sloping surface which engages the weight 178 opposite that which the cam surface 176 of the second sheave 168 engages. This surface slopes in the direction towards (i.e. gets closer to) the sheave 168 moving radially outward from the shaft 150.

The cam plate 180 has a portion generally opposite that portion which defines the sloping surface which is arranged to interlock with the sheave 168, whereby the sheave 168 and plate 180 rotate at the same speed. In accordance with this arrangement, when the clutch 144 is engaged and rotating the primary shaft 150, the sheaves 162, 168 engage the belt 154 and drive it The belt 154, in turn, drives a main shaft 156 via the driven pulley 160. This pulley 160 comprises a fixed sheave 182 and moveable sheave 184. The main shaft 156 rotates about an axis C5 which is parallel to the axis C3 about which the primary shaft 150 rotates. The axis C5 is offset generally horizontally from the axis C3, and positioned on the opposite side of the axis C2 about which the crankshaft 72 rotates. Referring to FIG. 4, the axis C5 is positioned a horizontal distance B from the axis C2.

The two sheaves 182, 184 cooperate to define a belt groove 186 in which the belt 154 is positioned, the belt 154 engaging the inner conical surfaces of each of these sheaves. As stated, one of the sheaves 184 is movably mounted on the main shaft 156. Means are provided for biasing this moveable sheave 184 towards the fixed sheave 182. This means preferably comprises a spring 188.

The transmission belt drive 152 is arranged with high and low drive positions. In particular, when the clutch 144 is engaged and the primary shaft 150 is rotating at a low speed, the moveable sheave 168 is positioned far from to the fixed sheave 162. The groove 170 is thus very large and the belt 154 is radially close to the primary shaft 150. At the same time, the spring forces the moveable sheave 184 on the main shaft 156 close to the fixed sheave 182 so that the groove 186 is small, forcing the belt 154 to be radially far from the main shaft 156. In that position, each rotation of the primary shaft 150 turns the main shaft 156 by a small amount.

On the other hand, when the engine speed is high, and thus primary shaft 150 rotational speed is high, the weight 178 spins outwardly and forces the moveable sheave 168 towards the fixed sheave 162. This causes the groove 170 to become smaller, forcing the belt 154 radially outward from the primary shaft 150. At the same time, the belt force cause the moveable sheave 184 on the main shaft 156 to move out from the fixed sheave 182, causing that groove 186 to become larger and permitting the belt 154 to move radially close to the main shaft 156. In this "high" position, each rotation of the primary shaft 150 effects a large degree of rotation of the main shaft 156.

The belt 154 rotates in a plane which is positioned in the belt case 127. This plane is perpendicular to the axis C2.

Figure 9:
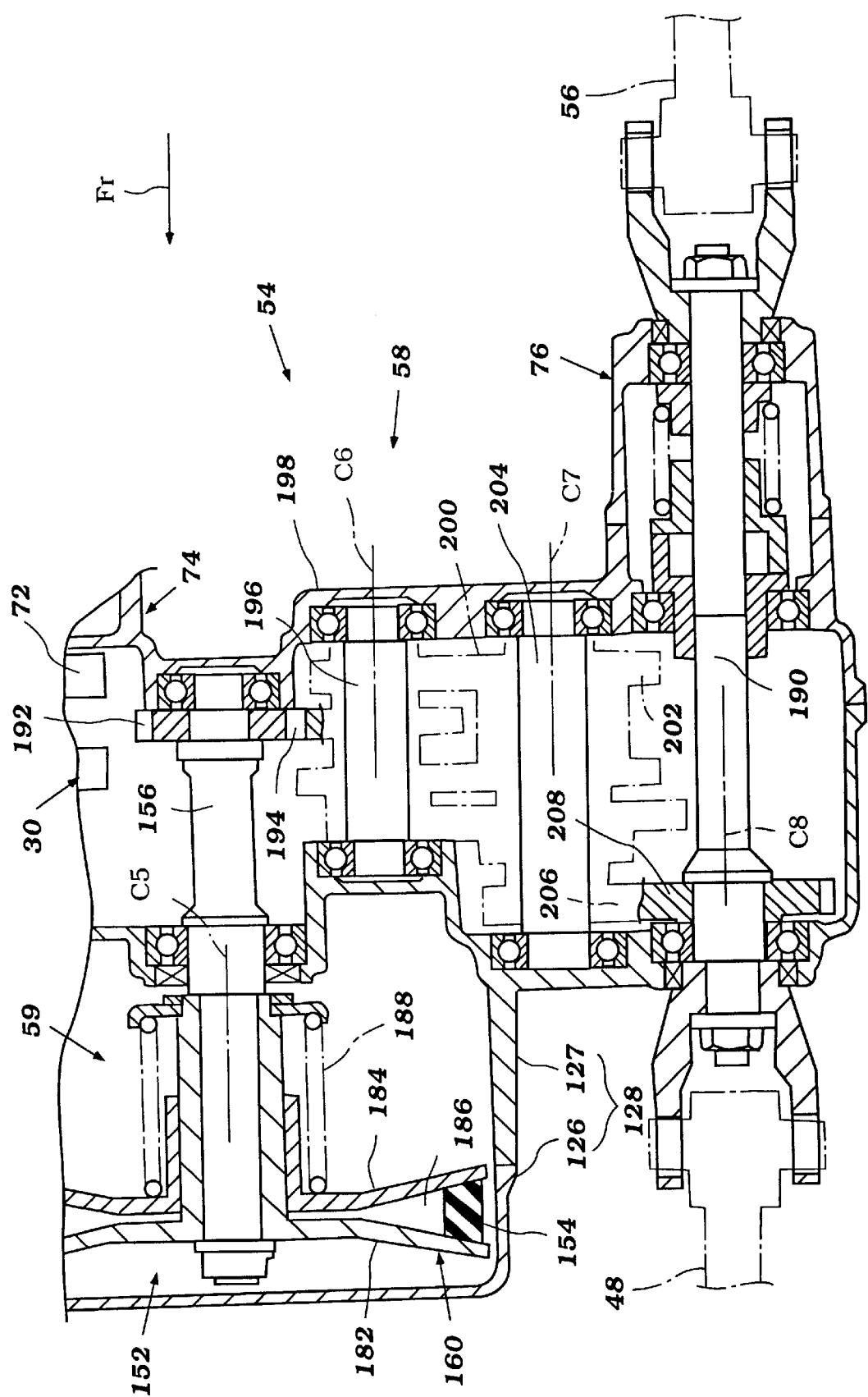
FIG. 9 is a second partial cross-sectional view of the transmission.

Referring to FIG. 9, the main shaft 156 is arranged to drive the drive shafts 48, 56 through an output shaft 190. A drive gear 192 is positioned on the end of the main shaft 156 opposite the driven pulley 160. This gear 192 drives a driven gear 194 on a first transfer shaft 196. This shaft 196 is mounted for rotation within a transmission chamber defined by a transmission case 198 (which is generally positioned between the crankcase and belt chamber) about an axis C6. The axis C6 is parallel to the axis C5, but is offset therefrom.

As illustrated, the main shaft 156 extends back through the body 127 from the belt chamber into a transmission chamber area One or more drive gears 200 positioned on the first transfer shaft 196 are arranged to drive one or more driven gears 202 on a second transfer shaft 204. This second transfer shaft 204 is mounted for rotation about an axis C7. This axis C7 is parallel to the axis C6, but offset therefrom generally vertically therebelow.

A drive gear 206 positioned on the second transfer shaft 204 is arranged to drive a main drive gear 208 on the output shaft 190. As illustrated, the output shaft 190 is positioned below the second transfer shaft 204. The output shaft 190 rotates about an axis C8. This axis C8 also passes through the drive shafts 48, 56, and is parallel to the axis C6 and C7.

Referring again to FIG. 8, a balancer shaft 210 is drive by the clutch shaft 142 at the end thereof opposite the primary shaft 150. The balancer shaft 210 rotates about an axis C9 which is coaxial with axes C3 and C4.

A balancer gear 212 is mounted at an end of the balancer shaft 210 opposite the clutch shaft 142. This end of the shaft 210 at which the gear 212 is mounted is positioned in the flywheel chamber 132. Referring to FIG. 10, this gear 212 drives a gear 214 positioned on an input shaft 216.

The input shaft 216 is preferably utilized to drive various drive unit 54 accessories, such as a means for delivering coolant to the engine 52 and a means for delivering lubricant to the engine 52. The means for delivering coolant preferably comprises a coolant pump 218 associated with a cooling system 220. The coolant pump 218 draws coolant C from a supply and delivers it to one or more cooling jackets or passages associated with the drive unit 54. As illustrated, the pump 218 is mounted at a first end of the input shaft 216, the shaft 216 driving an impeller or other fluid moving device associated with the pump 218.

The opposing end of the shaft 216 drives a lubricant pump 222 associated with a lubricating system 224. The pump 222 draws lubricant, such as natural or synthetic oil O, from a supply and delivers it to passages or galleries.

Preferably, as illustrated in FIG. 8, the lubricant is passed through an oil cooler 226 and a filter element 228 of the lubricating system 224. The oil cooler 226 and filter element 228 are connected to a portion of the flywheel case portion 130 of the crankcase cover 76. Preferably, a small gap or air space 230 is provided between these elements and the adjacent flywheel chamber 132.

The drive unit 54 also includes a generator 232. As best illustrated in FIG. 10, a drive gear 234 is mounted on the crankshaft 72 adjacent the flywheel 134. This gear 234 is positioned in the flywheel chamber 132. The drive gear 234 drives a first transfer gear 236 which is mounted on a rotatable shaft 238. This first transfer gear 236 drives a second transfer gear 240 mounted on a second shaft 242. These shafts 238, 242 are supported by the crankcase cover 76.

The second transfer gear 240 drives a generator gear 232 of the generator 244. This gear 244 is provided on a shaft of the generator 232, as is well known to those of skill in the art. The generator 232 may be used to charge a battery or power headlights or other electrical features associated with the vehicle 20.

As also illustrated in FIG. 10, the generator 232 is advantageously positioned in a recessed space 246 in the crankcase cover 76. In this arrangement, the generator 232 does not increase the size of the drive unit 54.

The above-described transmission arrangement has a number of advantages. First, the vehicle 20 is provided with a belt-drive type transmission. The belt 154 associated with this transmission 58 is positioned in an enclosed transmission or belt box 128 and thus protected from the elements such as dirt and water, providing for a long transmission life.

Because the belt 154 rotates at high speeds and rides on the drive and driven pulleys 158, 160, friction heat is generated in the belt box 128. In accordance with the present invention, the belt box 128 of the transmission 58 is arranged to dissipate this heat. As illustrated in FIG. 3, a front of the belt box 59 (i.e. that portion of the transmission 58 housing the "V"-belt 154) is positioned between the front wheels 32 and has portions facing the front of the vehicle in an unobstructed manner. When the vehicle 20 is traveling in the normal forward direction, air passes over the belt box 59, cooling it. This cooling effect prevents the belt 154 from overheating, lengthening the life of the belt.

Another feature of the invention is that the front drive shaft 48 is positioned very low. This permits the output shaft 190 to be positioned low. Since the output shaft 190 is positioned low, it does not pass through the belt chamber and does not interfere with the sealing of thereof. This further aids in preventing dirt, water and other material from entering the chamber and harming the belt 154 and other components.

The primary shaft 150 and main shaft 156 are positioned on opposing sides of the crankshaft 72, as illustrated in FIG.

4. In this arrangement, the width of the drive unit 54 is minimized. The vehicle 20 thus has improved stability and is less prone to roll-over.

The main shaft 156 is positioned vertically higher than the primary shaft 150, as illustrated in FIG. 4. Because the diameter of the driven pulley 160 is greater than the diameter of the drive pulley 158, the positioning of the main shaft 156 permits the vehicle 20 to have a high ground clearance.

Figure 5:
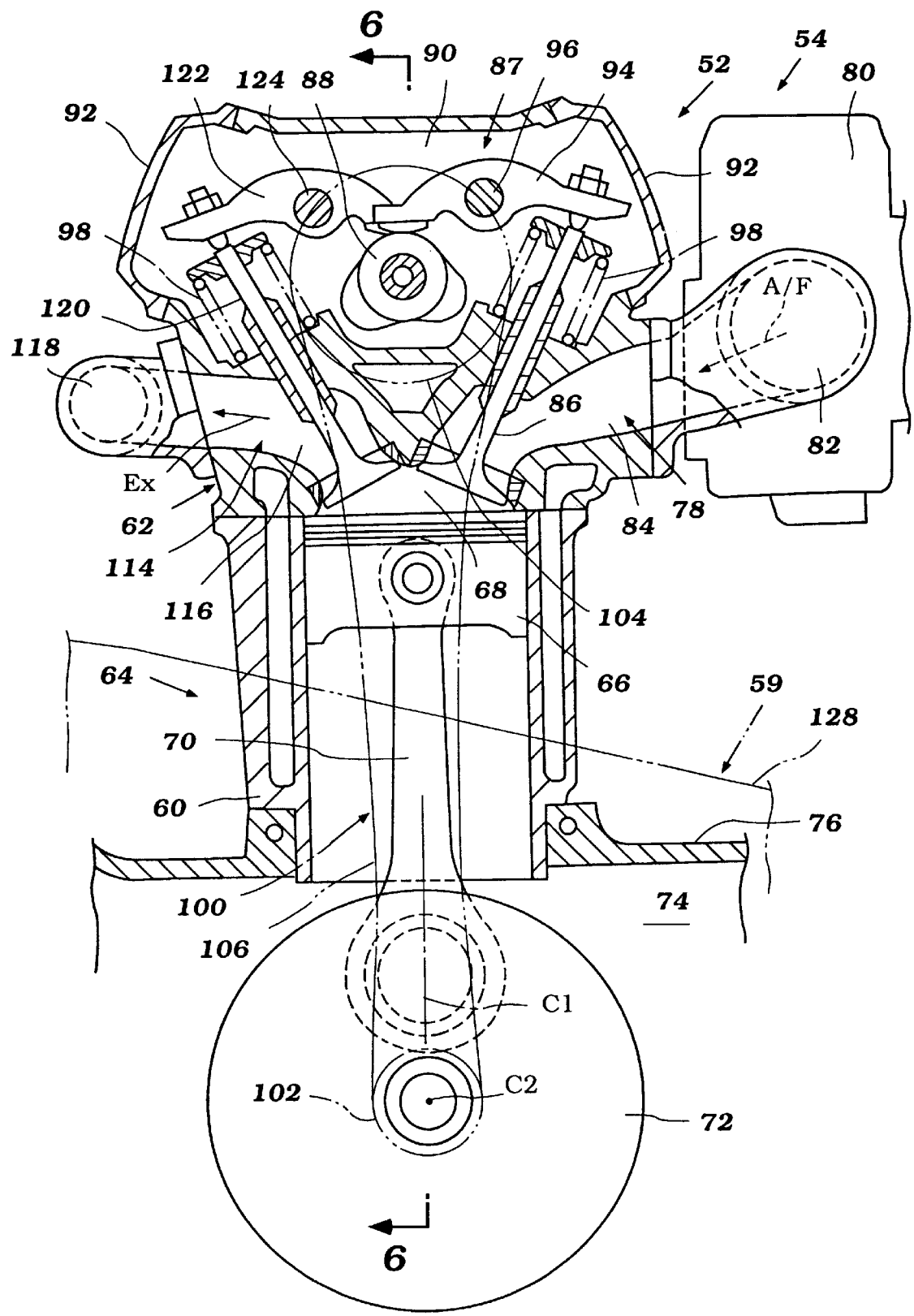
FIG. 5 is a cross-sectional view of the engine of the vehicle.
Figure 6:
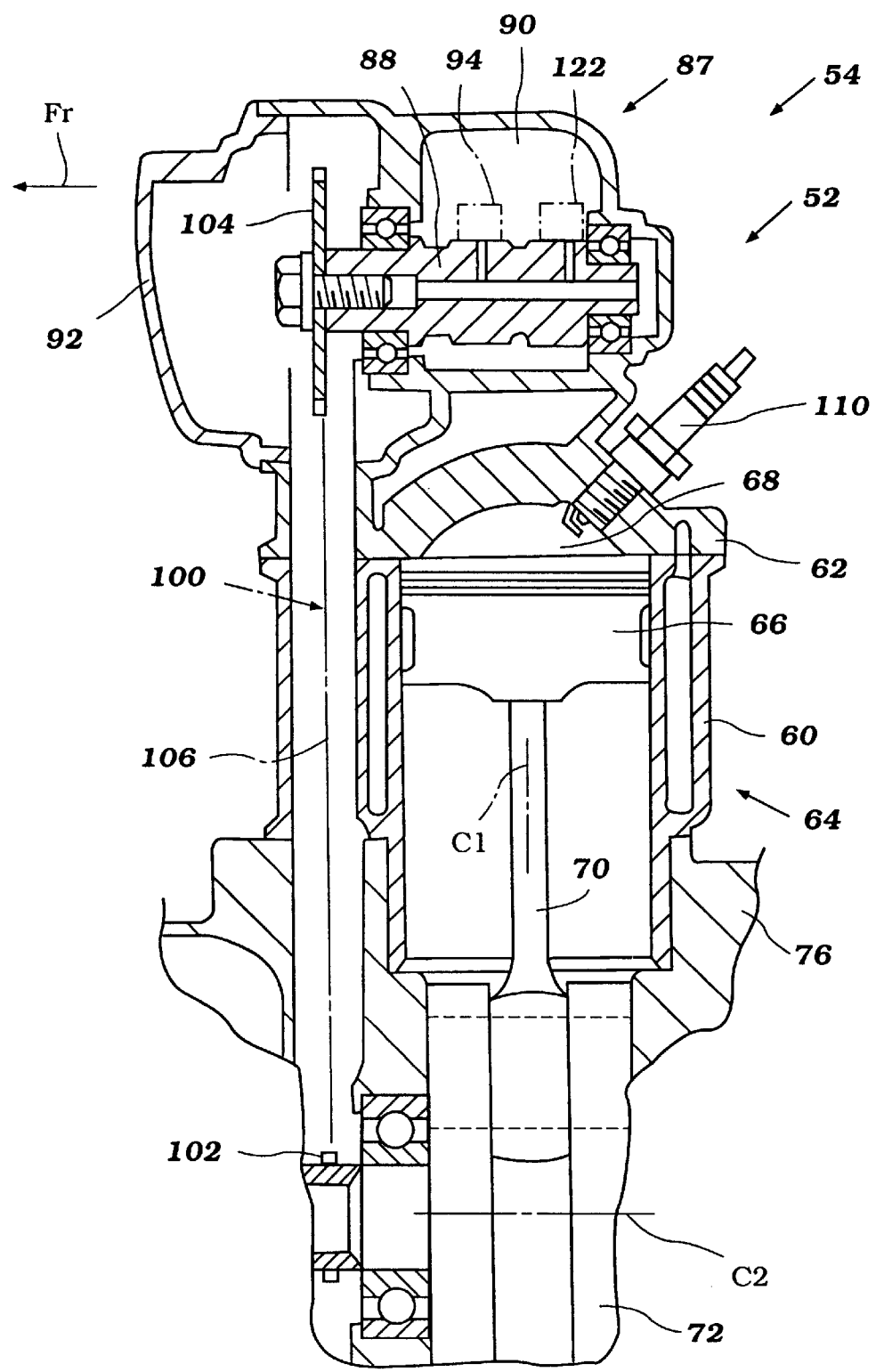
FIG. 6 is a cross-sectional view of the engine of the vehicle taken perpendicular to the cross-sectional illustrated in FIG. 5.
Figure 7:
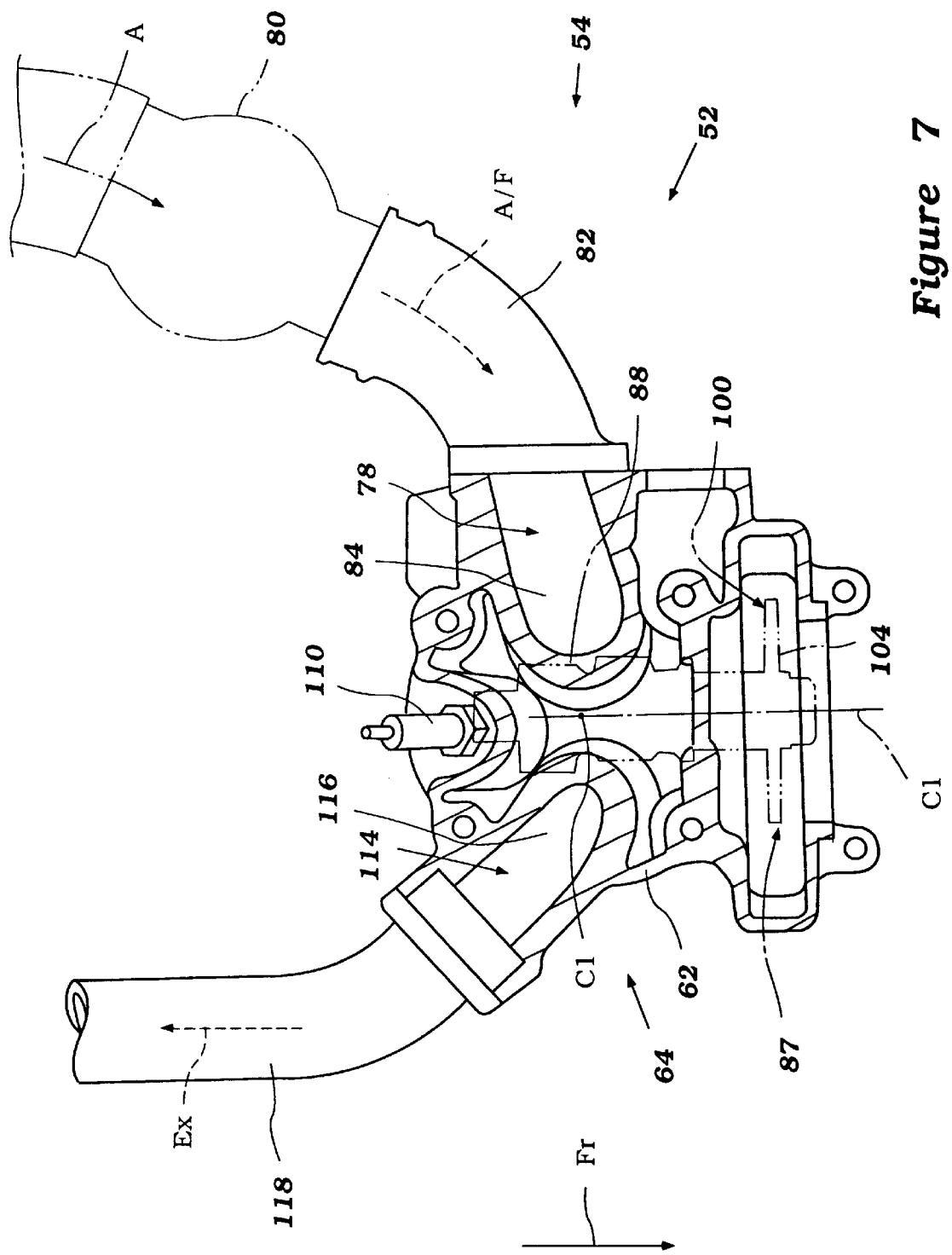
FIG. 7 is a top view of the engine of the vehicle, illustrating an intake system and an exhaust system thereof.

As illustrated in FIGS. 4 and 5, the intake system 78 and exhaust system 114 are positioned on opposite sides of the engine 52. In this manner, a space is provided between the intake system 78 and crankcase 74 therebelow, and the exhaust system 114 and crankcase 74 therebelow. This reduces the heat transfer rate between these engine features. In addition, the width of the engine 52 remains small and the center of gravity of the engine is centered.

The starter motor 136 is positioned at the rear end of the crankshaft 72, making for a more compact drive unit 54. The coil 108 is also positioned at the same end of the crankshaft 72 for the same reason. A recessed area or space is defined by the flywheel cover portion 132 at which are positioned the oil filter 228 and oil cooler 226, adjacent the coil 108 at the rear end of the drive unit 54.

The arrangement of the various shafts is such that the transmission 58 has a compact arrangement. The main shaft 156 and first and second transfer shafts 196, 204 are arranged vertically with respect to one another, as illustrated in FIG. 4. In addition, the primary shaft 156 and input shaft 216 are arranged vertically with respect to one another. The output shaft 190 is provided generally below the crankshaft 72. The arrangement of these shafts provides for efficient use of the space in the transmission 58.

In this arrangement, the crankshaft 72 is positioned generally within the area defined by the belt 154 path, whether in high or low position, when viewed from the front (see FIG. 4). Thus, the crankshaft 54 is positioned between the drive and driven pulleys 158, 160 when the transmission 58 is viewed from the front.

The camshaft drive 100 is provided at an end of the camshaft 88, and at a front end of the engine 52. This arrangement permits the engine 52 to have a small width from side-to-side. In addition, the intake and exhaust systems 78, 114 both extend from the engine 52 towards the rear of the vehicle 20, maintaining a small engine width.

A second embodiment transmission arrangement in accordance with the present invention is illustrated in FIGS. 11–17. In the description and illustrations of this embodiment, like reference numerals will be used to designate like or similar parts to those of the first embodiment, except that an "a" designator has been added to all of the reference numerals of this embodiment.

This embodiment vehicle 20a includes a transmission or belt ventilation system 250a. This system 250a includes an air duct 252a leading from an air intake port 254a to the belt chamber of the transmission, and an exhaust air duct 256a leading from the chamber to a discharge port 258a.

Figure 15:
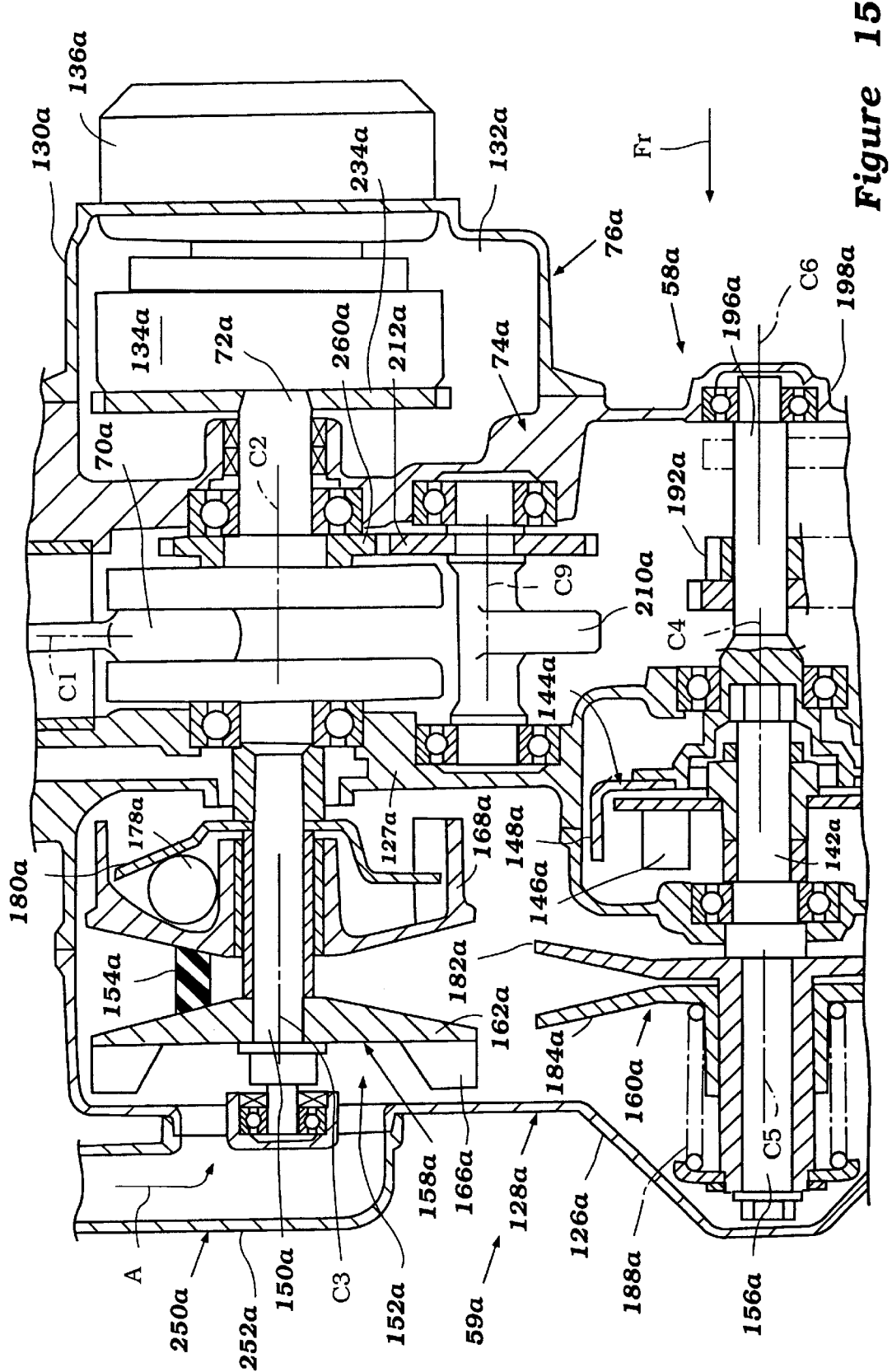
FIG. 15 is a partial cross-sectional view of the transmission of the vehicle.
Figure 16:
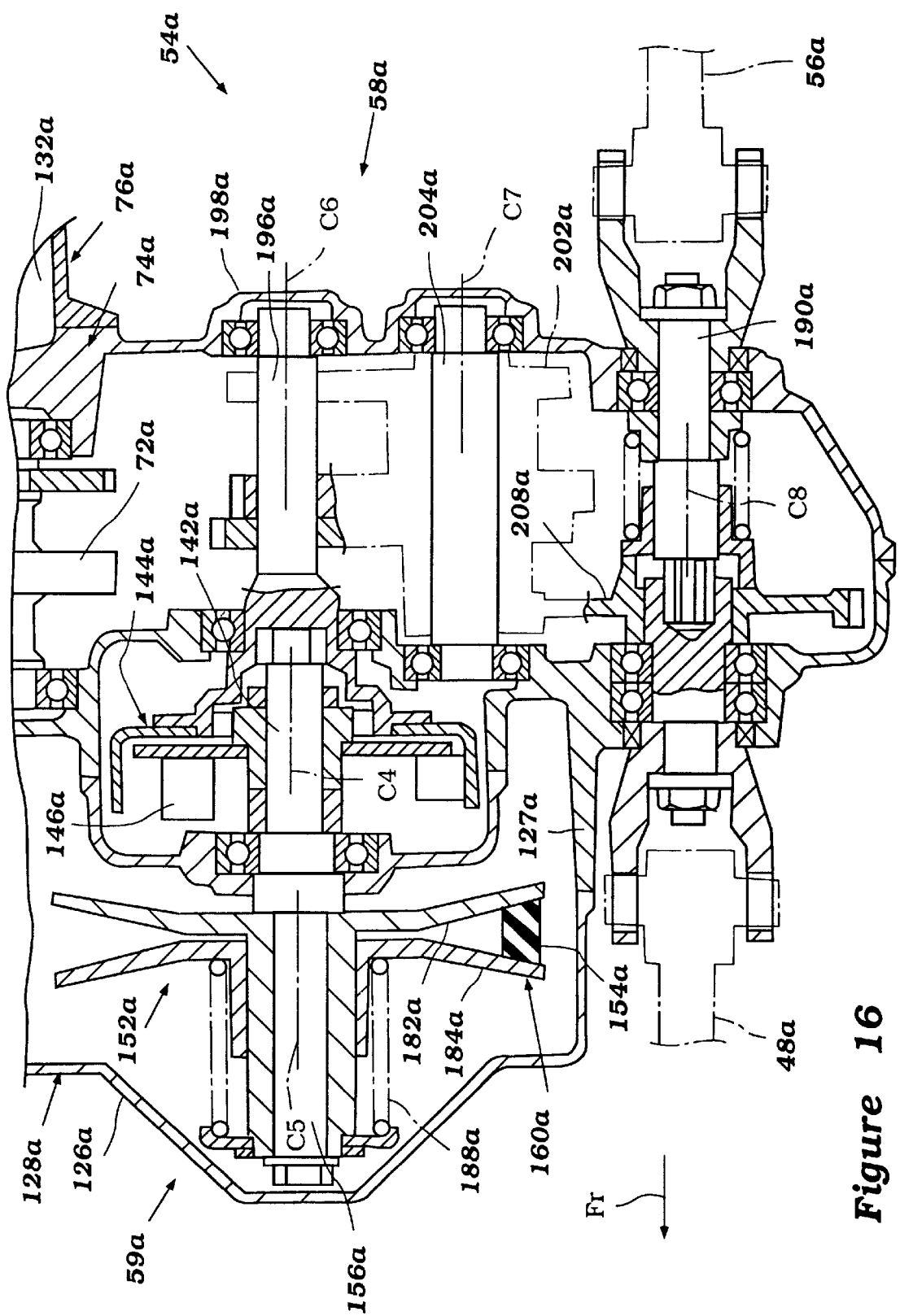
FIG. 16 is another partial cross-sectional view of the transmission of the vehicle.

The transmission 58a will be described with reference primarily to FIGS. 14–16. The crankshaft 72a drives the primary shaft 150a directly, their axes C2 and C3 being coaxial. The drive pulley 158a of a belt drive mechanism 152a is positioned on and driven by the primary shaft 150a.

As illustrated, the fixed sheave 162a of the drive pulley 158a is preferably mounted near the belt box cover 126a. The fins 166a are positioned to draw air A which flows through the air pipe 252a into the transmission 58a. The fins 166a preferably create an air current which forces the air out of the transmission 58a into the exhaust air duct 256a.

The drive pulley 158a drives a drive belt 154a. The drive belt 154a drives a driven pulley 160a which is positioned on a main shaft 156a. The main shaft 156a is arranged to drive a clutch shaft 142a of a centrifugal clutch 144a. The axis of the main shaft C5 and the axis C4 of the clutch shaft 142a are coaxial.

The clutch shaft 142a selectively drives a first transfer shaft 196a through the clutch 144a. The first transfer shaft 196a rotates about an axis C6 which is coaxial with the axes C4 and C5. The first transfer shaft 196a is arranged to drive a second transfer shaft 204a, which in turn drives an output shaft 190a.

The crankshaft 72a is arranged to drive a balancer shaft 210a which rotates about an axis C9. A drive gear 260a positioned on the crankshaft 72a drives a driven gear 212a positioned on the balancer shaft 210a.

Figure 17:
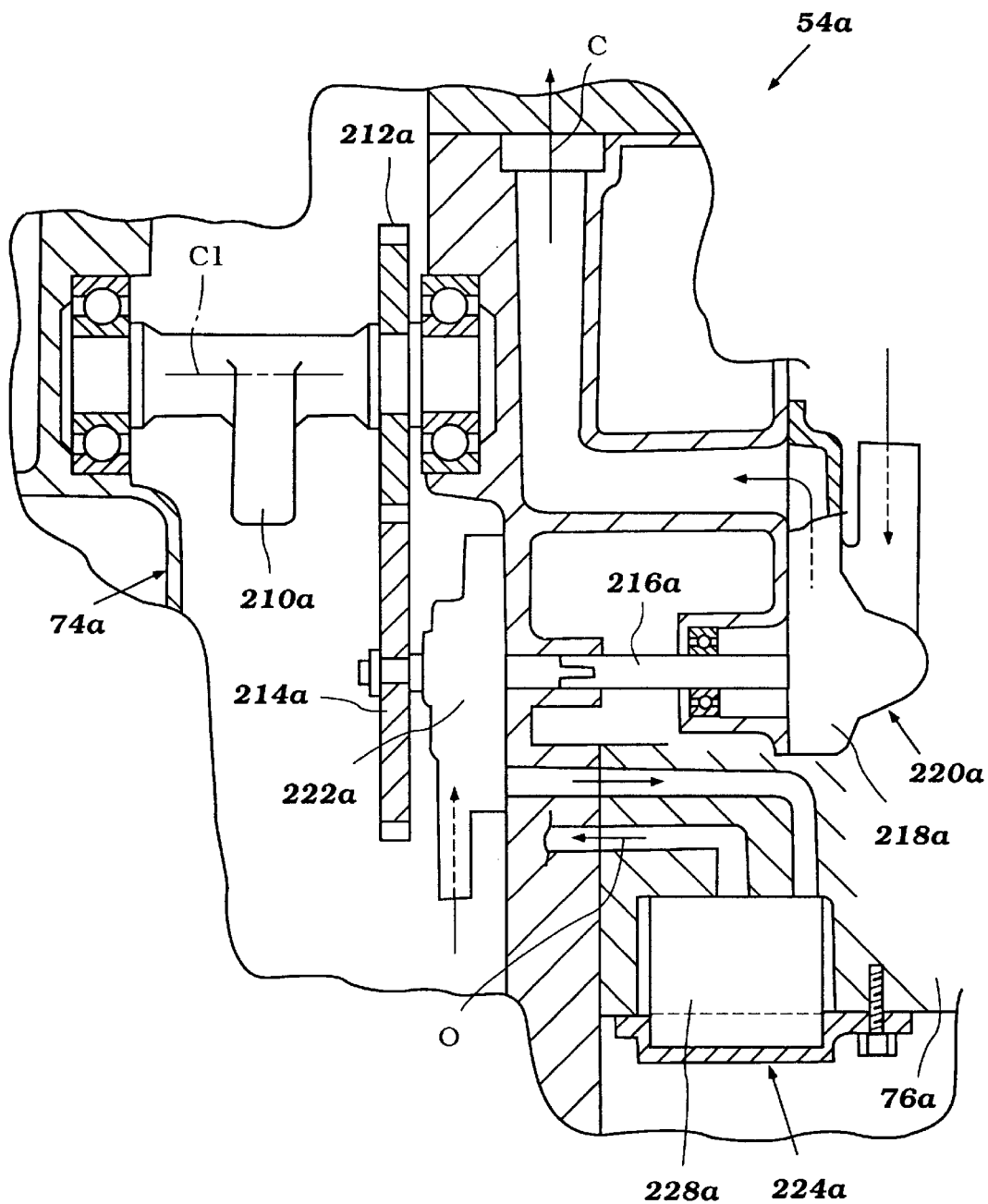
FIG. 17 is another partial cross-sectional view of the transmission of the vehicle, illustrating an accessory drive thereof.

Referring to FIG. 17, the gear 212a on the balancer shaft 210a is arranged to drive a gear 214a positioned on an input shaft 216a. A water or coolant pump 218a associated with a cooling system 220a is positioned at a first end of this shaft 216a. A lubricant pump 222a associated with a lubricating system 224a is positioned at the opposite end of the shaft 216a. The lubricant pump 222a delivers lubricant to a filter element 228a which is positioned in a recess in the crankcase cover 76a. A cover is selectively provided over the recess for enclosing the filter element 228a.

Figure 14:
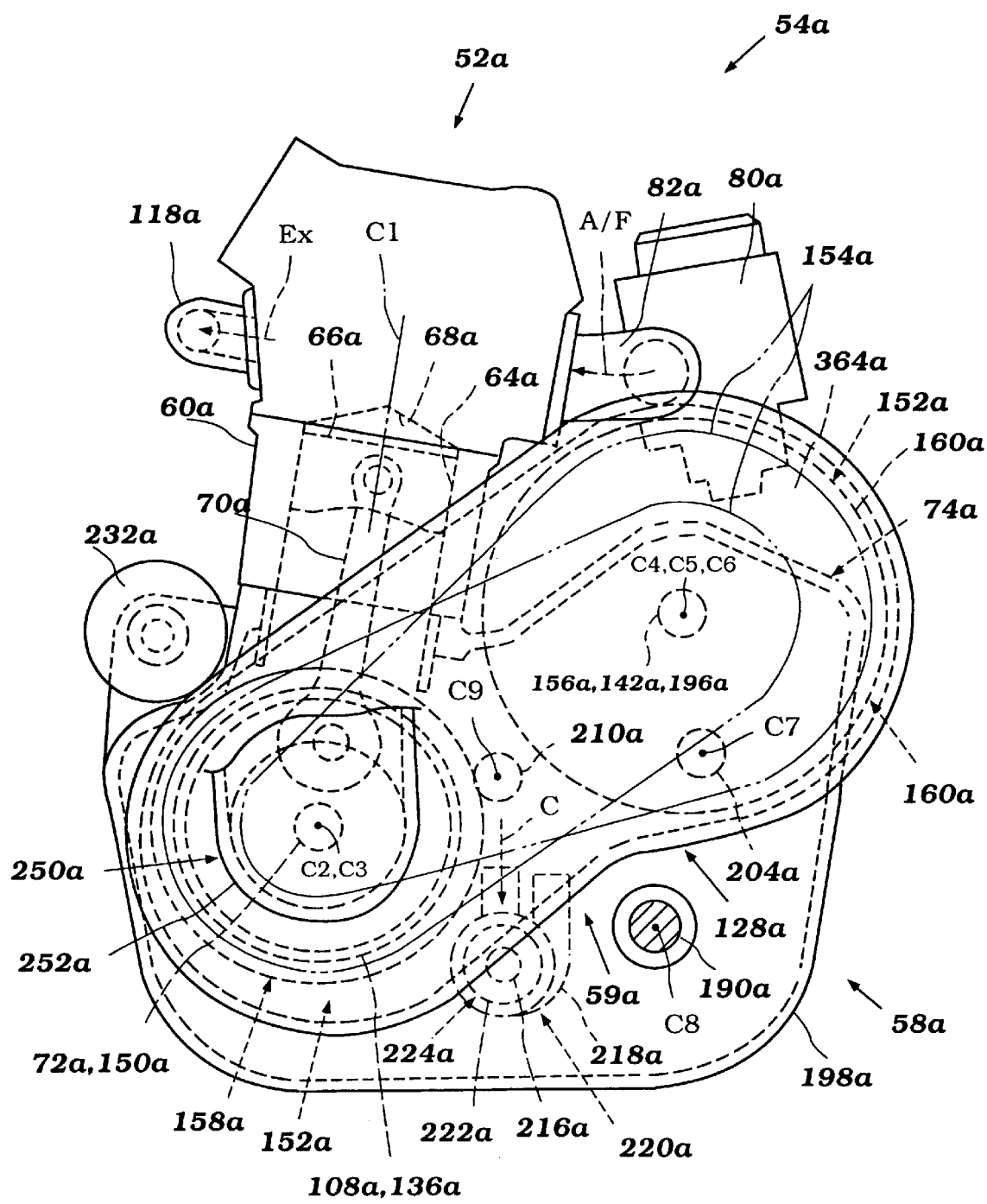
FIG. 14 is a first end view of an engine and transmission of a drive unit of the vehicle illustrated in FIG. 11.

The relative positions of the shafts is best illustrated in FIG. 14. As illustrated, the main shaft 156a is again positioned vertically higher than the primary shaft 150a, so that the transmission 58a still has a high clearance even though the larger diameter driven pulley 160a is positioned on the main shaft 156a.

The balancer shaft 210a is positioned between the primary shaft 150a and the main shaft 156a, providing for a compact arrangement. The input shaft 216a is also generally provided between the primary and main shafts 150a, 156a.

The main shaft 156a (and clutch and first transfer shafts 142a, 196a) is positioned vertically above the second transfer shaft 204a, which is in turn positioned generally vertically above the output shaft 190a. Again, this arrangement contributes to a compact arrangement, and especially one where the width of the drive unit 54a is small.

The engine 52a is slightly tilted so that the axis C1 is slightly offset from vertical. The generator 232a (like that described above) is provided in a space along the side of the engine 52a which results from this tilted arrangement, permitting the generator 232a to be close to the center of the drive unit 54a. The intake system extends outwardly into a recessed area 264a of the transmission case.

This embodiment arrangement again has the benefit that the belt box 59a is positioned at the front end of the drive unit 54a and faces towards the front of the vehicle 20a. When the vehicle 20a is moving in its normal forward direction, air passes over the cover 126a, cooling the belt box 59a. In addition, the transmission 58a is cooled by the air A which flows through the air intake duct 252a and out the exhaust air duct 256a.

Figure 18:
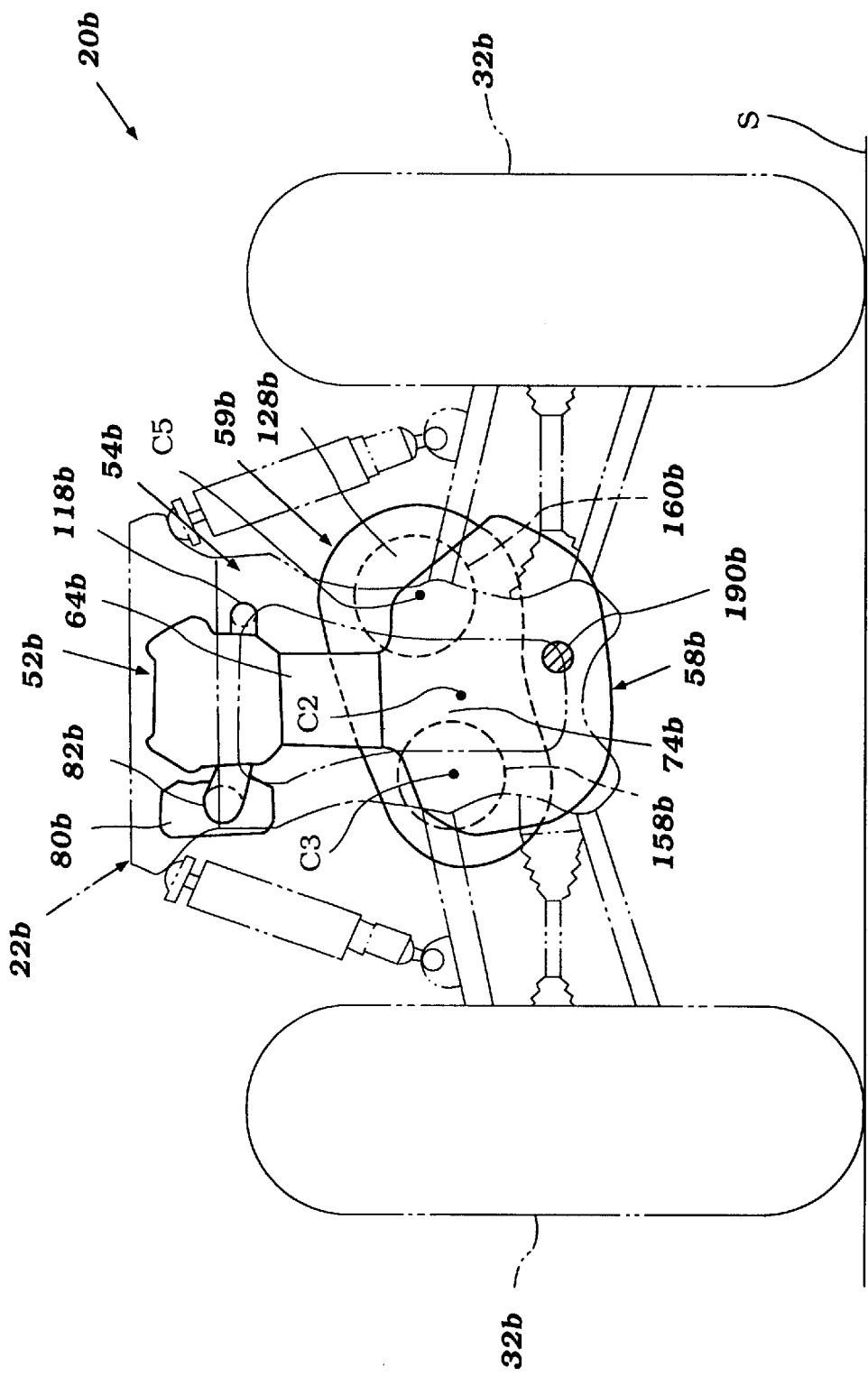
FIG. 18 is a front view of a vehicle having a transmission arrangement in accordance with a third embodiment of the present invention.

A third embodiment transmission arrangement in accordance with the present invention is illustrated in FIG. 18. In the description and illustrations of this embodiment, like reference numerals will be used to designate like or similar parts to those of the previous embodiments, except that a "b" designator has been added to all of the reference numerals of this embodiment This transmission arrangement is similar to that of the first embodiment, except that the belt box 59b is positioned at the rear end of the drive unit 54b. The case 128b has several portions, however, which extend outwardly beyond the engine 52b and the remainder of the transmission 58b. These portions are exposed in generally unobstructed fashion in the direction of the front of the vehicle 20b, so that when the vehicle is moving forward, air impacts these portions of the belt box 59b, cooling it.

In this embodiment, the intake and exhaust systems are illustrated on opposite sides of the engine 52b from the previous embodiments. In this orientation, the advantages of a narrow drive unit 54b are still obtained, however.

Those of skill in the art will appreciate that the axis C2 about which the crankshaft 72 rotates may extend transverse to the longitudinal axis through the vehicle 20. So arranged, the primary and main shafts 150, 156 are still preferably positioned on opposite sides of the crankshaft 72. When the crankshaft 72 is transversely mounted, a bevel gear or similar means must be used to transfer the rotational movement thereof to the output or drive shafts.

Of course, the foregoing description is that of preferred embodiments of the invention, and various changes and modifications may be made without departing from the spirit and scope of the invention, as defined by the appended claims.

What is claimed is:

1. An offroad vehicle having a frame, at least two wheels supporting said frame, an internal combustion engine supported by said frame, said engine having at least one cylinder, a piston positioned in said cylinder and reciprocating along a first axis, said piston driving a crankshaft of said engine, said crankshaft arranged to drive at least one of the wheels through a transmission, said vehicle having a front end and a rear end and a longitudinal centerline extending through said ends, said crankshaft of said engine extending along a second axis generally parallel to said centerline, said transmission including a chamber defined by a case, a primary shaft at least partially positioned in said chamber and driven by said crankshaft, a main shaft at least partially positioned in said chamber and offset from said primary shaft, said primary shaft and said main shaft being positioned on opposite sides of said crankshaft, said main shaft driven by said primary shaft by a belt positioned in said chamber, said main shaft arranged to drive said at least one of said wheels, at least a portion of said case facing said front end of said vehicle unobstructed.

2. The offroad vehicle in accordance with claim 1, wherein said case is positioned forward of said engine.

3. The offroad vehicle in accordance with claim 1, wherein said main shaft drives at least one drive shaft which is arranged to drive at least one of said wheels, said at least one drive shaft positioned vertically below said chamber.

4. The offroad vehicle in accordance with claim 1, wherein a drive pulley is positioned on said primary shaft and a driven pulley is positioned on said main shaft, said diameter of said driven pulley being larger than a diameter of said drive pulley, said belt engaging said drive and driven pulleys, said main shaft positioned vertically above said primary shaft.

5. The offroad vehicle in accordance with claim 1, wherein said engine includes an intake system and an exhaust system, said intake system extending from a first side of said engine and said exhaust system extending from an opposing second side of said engine.

6. The offroad vehicle in accordance with claim 1, wherein said engine has a body with a first end and a second end, a crankcase positioned at said second end, said case positioned forward of said crankcase, and wherein a starter is positioned at said side of said crankcase opposite said case.

7. The offroad vehicle in accordance with claim 1, wherein said crankshaft has a first end and a second end, said first end arranged to drive said primary shaft, and wherein a coil is provided at said second end.

8. The offroad vehicle in accordance with claim 7, wherein said crankcase includes a recessed area adjacent an area housing said second end of said crankshaft, at least one element of a lubricating system positioned in said recessed area.

9. The offroad vehicle in accordance with claim 1, wherein said main shaft drives a first transfer shaft, said first transfer shaft drives a second transfer shaft, said second transfer shaft drives an output shaft, said output shaft arranged to drive said at least one of said wheels, said main shaft and first and second transfer shafts being generally vertically arranged.

10. The offroad vehicle in accordance with claim 1, wherein said crankshaft selectively drives said primary shaft through a clutch.

11. The offroad vehicle in accordance with claim 10, wherein said main shaft selectively drives said first transfer shaft through a clutch.

12. The offroad vehicle in accordance with claim 1, wherein said second axis extends through a plane in which said belt rotates and within an area traversed by said belt in said plane.

13. The offroad vehicle in accordance with claim 5, wherein said intake and exhaust systems extend from said engine towards a rear of said vehicle.

14. The offroad vehicle in accordance with claim 1, wherein said crankshaft drives at least one input shaft, at least one engine accessory driven by said input shaft.

15. The offroad vehicle in accordance with claim 14, wherein said at least one engine accessory comprises an oil pump.

16. The offroad vehicle in accordance with claim 14, wherein said at least one engine accessory comprises a coolant pump.

17. The offroad vehicle in accordance with claim 1, wherein an air intake duct leads to said chamber and an air exhaust duct leads from said chamber.

18. An offroad vehicle having a frame, at least two wheels supporting said frame, an internal combustion engine supported by said frame, said engine having at least one cylinder, a piston positioned in said cylinder and reciprocating along a first axis, said piston driving a crankshaft of said engine about a first axis, said crankshaft arranged to drive at least one of the wheels through said transmission, said vehicle having a front end and a rear end and a longitudinal centerline extending through said ends, said transmission including a chamber defined by a case, a primary shaft at least partially positioned in said chamber and driven by said crankshaft about a second axis, a main shaft at least partially positioned in said chamber and offset from said primary shaft, said main shaft driven about a third axis by said primary shaft by a belt positioned in said chamber, said main shaft arranged to drive said at least one of said wheels, said second axis and said third axis positioned on opposite sides of a plane extending through said first axis, and at least a portion of said case facing said front end of said vehicle unobstructed.

19. The offroad vehicle in accordance with claim 18, wherein said first, second and third axes extend parallel to one another.

20. An offroad vehicle comprising an engine and a transmission, said engine comprising a crankshaft capable of being rotatably driven about a first axis that extends in a longitudinal direction said crankshaft being mounted within a crank chamber, a crankcase at least partially defining said crank chamber, said transmission comprising an output shaft, said output shaft being at least partially positioned within a gearbox and being selectively driven about a second axis by said crankshaft, said transmission also comprising a belt drive, said belt drive comprising a drive pulley and a driven pulley, said drive pulley being capable of driving said driven pulley, said drive pulley being mounted on a primary shaft for rotation about a third axis and said driven pulley being mounted on a main shaft for rotation about a fourth axis, said belt drive being substantially encased within a belt box, said belt box being at least partially defined by a removable cover and being partitioned from said crank chamber said gear box, said second axis being positioned generally vertically lower than said first axis and said first axis being positioned generally lower than said fourth axis and said second axis, said third axis and said fourth axis being generally parallel to said first axis.

21. The offroad vehicle of claim 20, wherein said first axis and said third axis are axially aligned.

22. The offroad vehicle of claim 20, wherein said third axis is offset from said first axis.

23. The offroad vehicle of claim 22, wherein said third axis is positioned generally higher than said first axis.

24. The offroad vehicle of claim 22, wherein a first distance defined between said first axis and said third axis is shorter than a second distance defined between said first axis and said fourth axis.

25. The offroad vehicle of claim 22, wherein said first axis is disposed generally between said third axis and said fourth axis.

26. The offroad vehicle of claim 20, wherein a clutch allows said primary shaft to be selectively driven by said crankshaft and said clutch has a rotatable member that rotates about a fifth axis.

27. The offroad vehicle of claim 26, wherein said third axis and said fifth axis are axially aligned.

28. The offroad vehicle of claim 26, wherein said engine further comprises a cylinder in which a piston is reciprocally mounted, said cylinder being inclined toward said fourth axis relative to a vertically extending plane defined through said first axis.

29. The offroad vehicle of claim 20, wherein said main shaft drives a first transfer shaft about a sixth axis, said first transfer shaft drives a second transfer shaft about a seventh axis, and said fourth axis, said sixth axis and said seventh axis are generally vertically aligned.

30. The offroad vehicle of claim 20, wherein said output shaft is positioned lower than said belt box such that said output shaft does not extend through any portion of said belt box.

31. The offroad vehicle of claim 20, wherein said main shaft selectively drives a first transfer shaft through a centrifugal clutch.

32. The offroad vehicle of claim 20 further comprising a balancer shaft being driven by said crankshaft, said balancer shaft driving a lubricant pump and a cooling pump.

33. The offroad vehicle of claim 32, wherein said lubricant pump and said cooling pump have a common input shaft and said common input shaft carries a first gear that is drivingly connected to a second gear carried by said balancer shaft.

34. The offroad vehicle of claim 33, wherein said common shaft extends through said cooling pump and said cooling pump and said lubricant pump are positioned to a single side of said first gear.

35. The offroad vehicle of claim 33, wherein said cooling pump and said lubricant pump are positioned to a single side of said first gear.

36. The offroad vehicle of claim 33, wherein said first gear is interposed along said common input shaft between said lubricant pump and said cooling pump.

37. The offroad vehicle of claim 32, wherein said balancer shaft forms a portion of a clutch that selectively connects said primary shaft to said crankshaft.

38. An offroad vehicle comprising a frame and a longitudinal plane that is generally defined from a front end of said vehicle to a rear end of said vehicle, said front end providing said vehicle with a generally open forward end, an engine compartment being defined by said frame rearward of said front end, said frame being supported by at least two wheels, a drive unit being mounted within said engine compartment, said drive unit selectively powering said vehicle and comprising an engine and a transmission, said transmission comprising a continuously variable speed drive, said continuously variable speed drive being positioned within a drive chamber and comprising a drive pulley and a driven pulley, said drive pulley being supported by a primary shaft and said driven pulley being supported by a main shaft, a flexible transmitter transmitting rotational motion from said drive pulley to said driven pulley and extending around said drive pulley and said driven pulley, said drive chamber being at least partially defined by a case and said case comprising a forward facing surface that is positioned to allow air flowing through said generally open forward end to impinge upon at least a portion of said forward facing surface without substantial redirection around any other vehicle component.

39. The vehicle of claim 38, wherein said crankshaft rotates about a first axis that is generally parallel to said longitudinal plane and said portion of said forward facing surface is positioned directly forward of said first axis.

40. The vehicle of claim 38, wherein the engine further includes an intake passage and an exhaust passage, said intake passage extending from a first lateral side of said engine and said exhaust passage extending from a second lateral side of said engine.

41. The vehicle of claim 40, wherein flow through said exhaust passage and said intake passage is controlled by a set of valves and said valves are moved by a cam shaft drive that comprises a flexible transmitter positioned on a forward side of said engine.

42. The vehicle of claim 40, wherein said at least two wheels comprise two front wheels, a first vertical plane being defined by an innermost edge of one of said two front wheels and a second vertical plane being defined by an innermost edge of the other of said two front wheels and said case being completely positioned between said first vertical plane and said second vertical plane.

43. The vehicle of claim 40, wherein said case is positioned on a forward side of said engine.

44. The vehicle of claim 40 further comprising an air inlet being connected to said case and an air outlet being connected to said case such that air can be circulated through said case.

45. The vehicle of claim 44, wherein said air inlet is connected to said case proximate said drive pulley.

46. The vehicle of claim 45, wherein said drive pulley comprises a fixed sheave that includes fins for increasing air circulation within said case.

47. The vehicle of claim 45, wherein said drive pulley further comprises a moveable sheave that is interposed between said fixed pulley and said crank chamber.

48. The vehicle of claim 45, wherein said air inlet is connected to said case proximate an outer circumference of said drive pulley.

49. The vehicle of claim 38, wherein said engine comprises a crankshaft having a first end and a second end, said first end selectively powering said transmission and a coil being connected to said second end.

50. The vehicle of claim 49, wherein said coil is positioned within a flywheel housing.

51. The vehicle of claim 50, wherein said crankshaft is positioned within a crank chamber at least partially defined by a crankcase, said crankcase having a recessed area proximate said flywheel housing and at least one element of a lubrication system being mounted in said recessed area.

52. The vehicle of claim 51 wherein said element is a lubrication filter.

53. The vehicle of claim 49, wherein a starter is positioned proximate said coil and is capable of selectively driving said crankshaft.

54. The vehicle of claim 49, wherein said crankshaft extends generally front to rear such that said first end corresponds to a forward end of said crankshaft and said second end corresponds to a rearward end of said crankshaft such that said coil is positioned to the rear end of said crankshaft.

55. The vehicle of claim 38, wherein said case is positioned adjacent a forward facing surface of a crankcase of said engine.

56. The vehicle of claim 38, wherein said case is positioned adjacent a rearward facing surface of a crankcase of said engine.

\* \* \* \* \*